United States Patent [19]
Suzuki

[11] Patent Number: 5,247,382
[45] Date of Patent: Sep. 21, 1993

[54] POLARIZATION SWITCHING LIGHT SOURCE, OPTICAL RECEIVER, AND COHERENT OPTICAL TRANSMISSION SYSTEM

[75] Inventor: Nobuo Suzuki, Tokyo, Japan

[73] Assignee: Kabushiki Kaisha Toshiba, Kawasaki, Japan

[21] Appl. No.: 753,634

[22] Filed: Aug. 30, 1991

[30] Foreign Application Priority Data

Aug. 30, 1990 [JP] Japan .................. 2-226531

[51] Int. Cl.[5] .................. H04B 10/00; H04B 10/06
[52] U.S. Cl. .................. 359/156; 359/189; 359/192; 359/183
[58] Field of Search ........... 359/192, 191, 189, 194, 359/183, 156, 132, 133, 140, 164, 139, 137

[56] References Cited

U.S. PATENT DOCUMENTS

| 4,718,120 | 1/1988 | Tzeng ................ | 359/192 |
| 5,008,958 | 4/1991 | Cimini, Jr. et al. .......... | 359/192 |
| 5,031,236 | 7/1991 | Hodgkinson et al. .......... | 359/189 |
| 5,060,311 | 10/1991 | Meissner et al. ............ | 359/192 |

FOREIGN PATENT DOCUMENTS

| 0329186 | 8/1989 | European Pat. Off. . | |
| 0357799 | 3/1990 | European Pat. Off. . | |
| 0052530 | 3/1988 | Japan ................ | 359/183 |
| 2213026 | 8/1989 | United Kingdom . | |

OTHER PUBLICATIONS

Electronics Letters, vol. 24, No. 15, Jul. 21, 1988, pp. 974–976, I. M. I. Habbab, et al., "Phase-Insensitive Zero-If Coherent Optical System Using Phase Switching".

Primary Examiner—Edward L. Coles, Sr.
Assistant Examiner—Kinfe-Michael Negash
Attorney, Agent, or Firm—Oblon, Spivak, McClelland, Maier & Neustadt

[57] ABSTRACT

A polarization switching light source includes a semiconductor laser for outputting laser output light, a phase modulation circuit for subjecting phase modulation of a predetermined cyclic pattern to the semiconductor laser by supplying a pulse current thereto, a beam splitter for dividing output light from the semiconductor laser into first and second branch output light components having substantially the same power, an optical delay member for delaying the first branch output light with respect to the second branch output light by a predetermined amount, and a mixing member for mixing the first branch output light component, delayed by the optical delay member, with the second branch output light component while their polarization states are caused to be orthogonal. A delay time of the first branch output light component with respect to the second branch output light component is set to be a fraction of an integer of the period of the phase modulation.

33 Claims, 18 Drawing Sheets

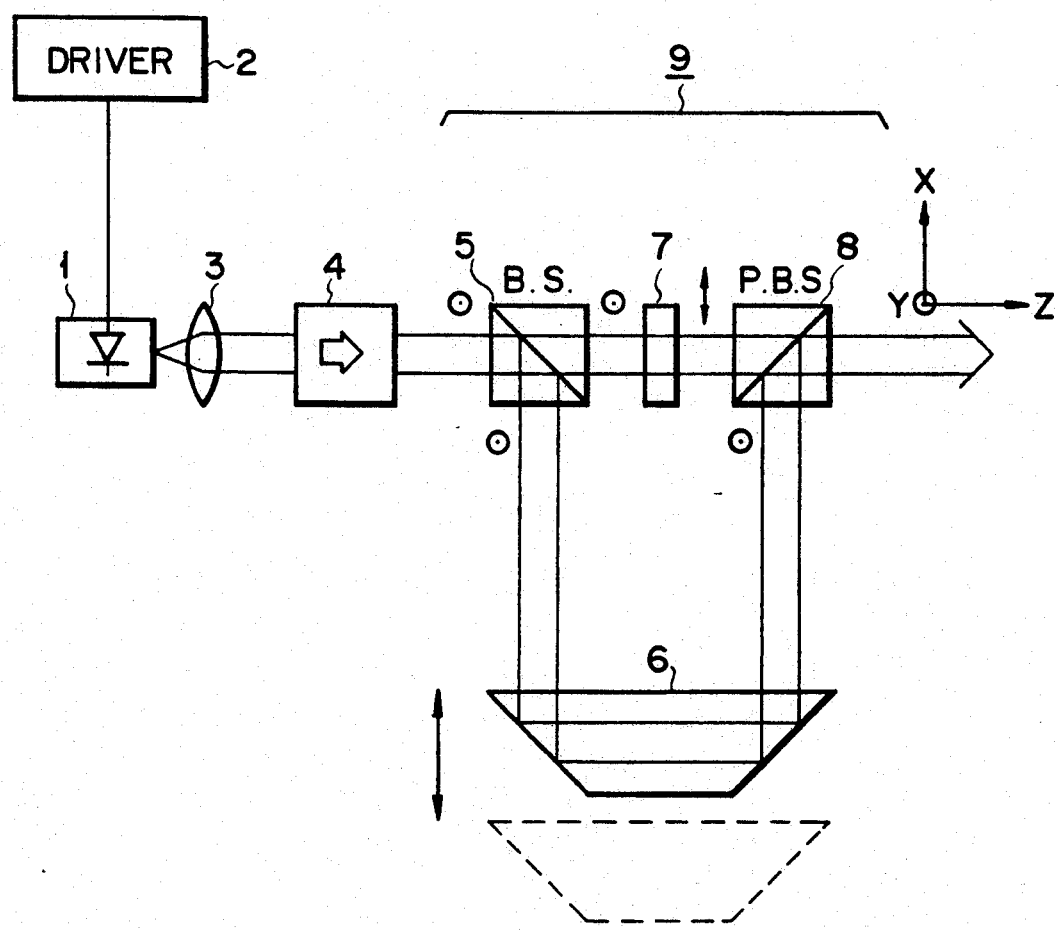
F I G. 1

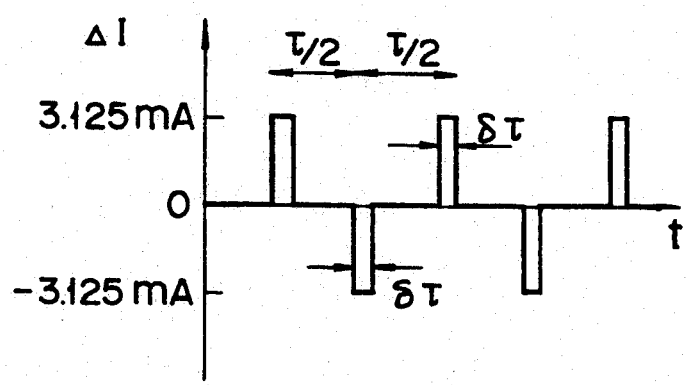
F I G. 3A
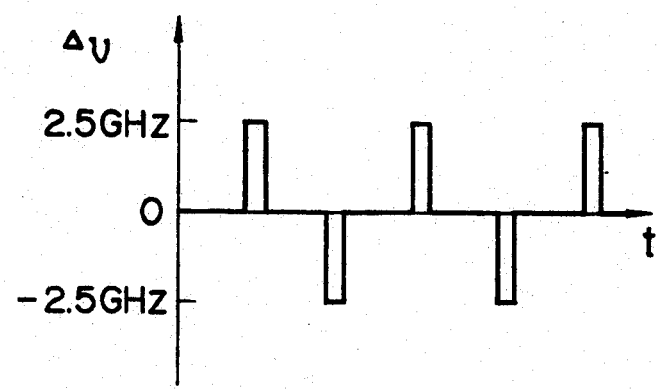
F I G. 3B
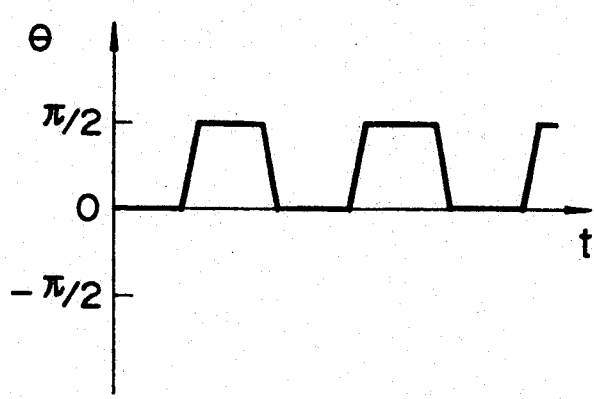
F I G. 3C

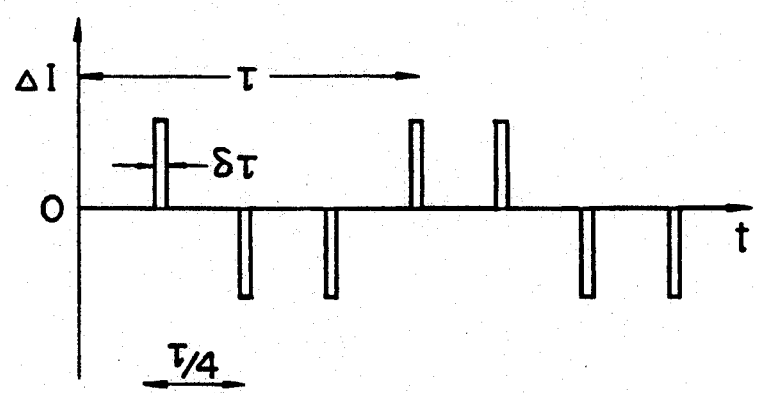
FIG. 6A
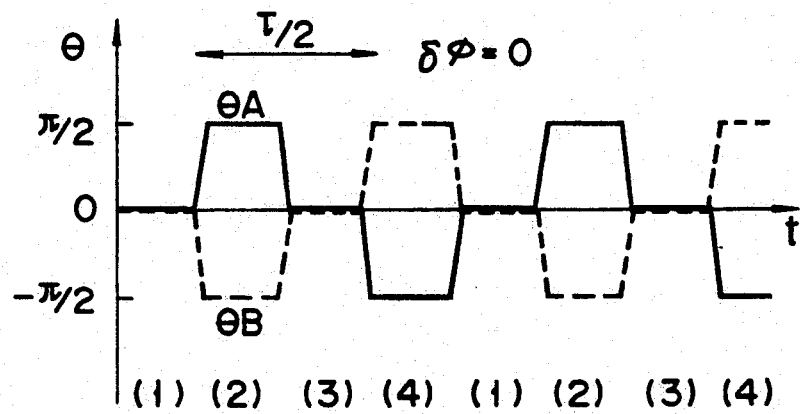
FIG. 6B
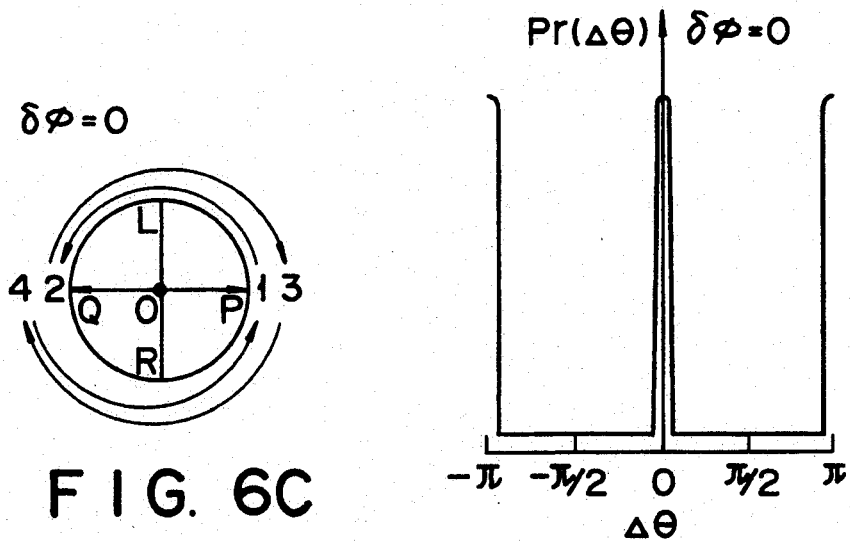
FIG. 6C
FIG. 6D

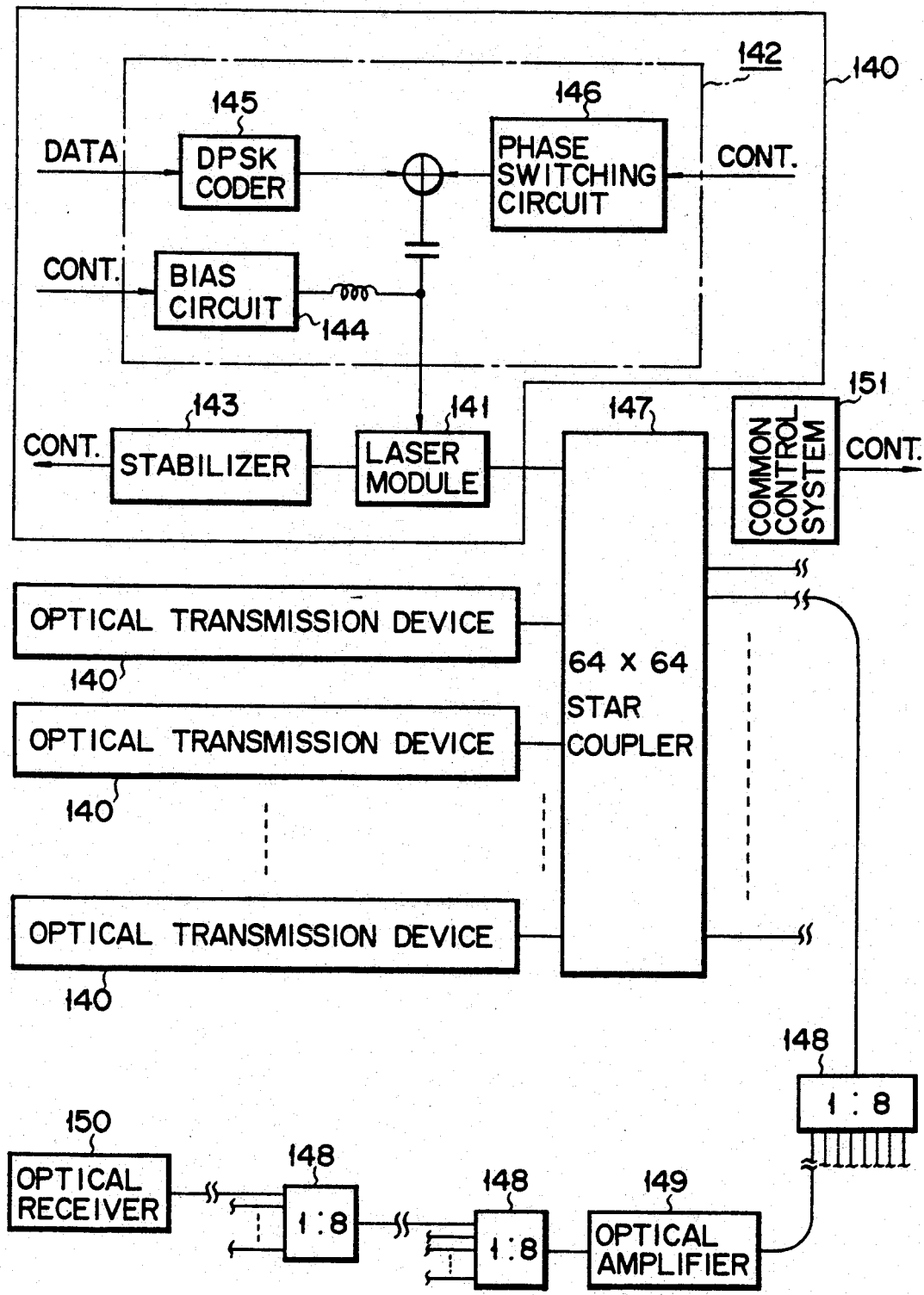
F I G. 13A

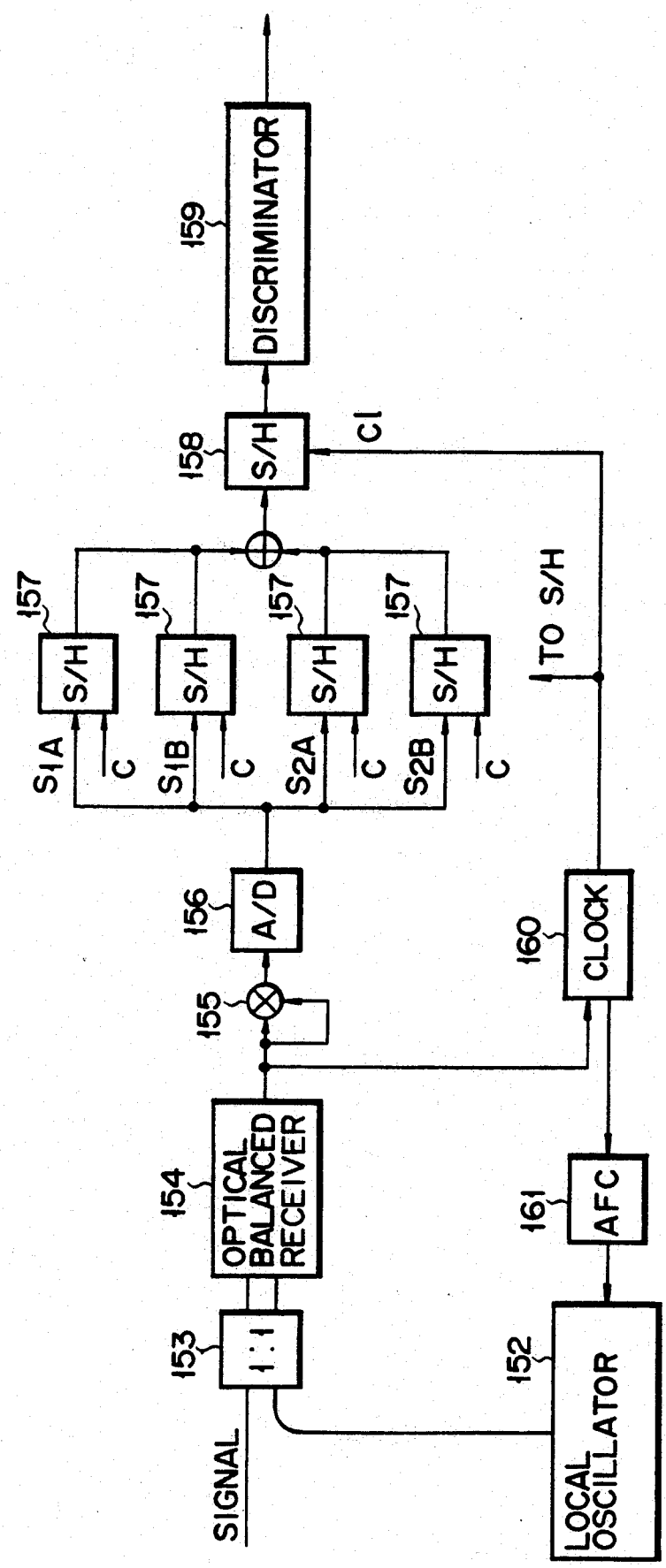
F I G. 13B

POLARIZATION SWITCHING LIGHT SOURCE, OPTICAL RECEIVER, AND COHERENT OPTICAL TRANSMISSION SYSTEM

BACKGROUND OF THE INVENTION

1. Field of the Invention

The present invention relates to coherent optical communication techniques and, more particularly, to a polarization switching light source, an optical receiver, and a coherent optical transmission system.

2. Description of the Related Art

Recently, rapid progresses have been made in coherent optical communication techniques in which heterodyne detection or homodyne detection is performed by utilizing the properties of light as a wave (e.g., T. Okoshi and K. Kikuchi, "Coherent Optical Fiber Communications", KTK Scientific Publishers, Tokyo, 1988). In coherent optical communication, a local oscillation source is prepared on the reception side to receive a beat signal resulting from interference between signal light and local oscillation light and appearing in a photodetector. Since the spectrum purity of signal light or local oscillation light is higher than that in a conventional direct detection system, optical frequency division multiplexing (optical FDM) with high density can be realized. The realization of an optical FDM, in combination with the recent remarkable advances in the optical amplifier, enables long-range nonrepeated (or multiple branch) optical communication of a capacity much larger than that of a conventional system. Such a technique, therefore, is expected to be applied to various types of communication systems, e.g., a broad band ISDN, a high definition optical CATV, and a metropolitan area network (MAN).

Several problems, however, are posed in the practical application of coherent optical communication. The first problem is associated with polarization matching; the second problem, phase noise; the third problem, the band width of a receiver; and the fourth problem, image components which interfere with the realization of a high density optical FDM. These problems will be sequentially described below.

(a) Problems associated with polarization matching

In general, signal light transmitted through an optical fiber varies in polarization state depending on the temperature of the fiber, a stress acting thereon, and other disturbances. Assuming that local oscillation light is in a constant polarization state, a variation in polarization state of signal light corresponds to the intensity variation of a beat signal resulting from interference. In an extreme case, if the polarization states of signal light and local oscillation light are orthogonal, the resulting beat output becomes zero. In order to solve this problem, the following means are proposed:

(1) the use of a polarization maintaining fiber
(2) mechanical or electrooptical control of polarization states
(3) polarization diversity reception
(4) polarization scrambling or polarization switching However, with regard to (1) the use of a polarization maintaining fiber, problems are posed in terms of a connection method, cost, and the like. In addition, with regard to (2) control of polarization states in a fiber, problems are posed in terms of a trade-off between infinite tracking properties and complexity of a controller, reliability, size, difficulty in a multichannel optical FDM, difficulty in cold start, and the like.

For the above-described reasons, (3) polarization diversity reception is widely used (e.g., L. G. Kazovsky, "Phase- and Polarization-Diversity Coherent Optical Techniques", Journal of Lightwave Technology, Vol. 7. No. 2 pp. 279-292. February 1989). In this method, two independent polarization components are separately received (multi-port reception), and the received components are electrically synthesized. The method, however, requires a complicated optical system for a receiver, and also requires two light receivers and two intermediate frequency (IF) circuits. In consideration of the application of the method to a subscriber's system such as an optical CATV system, aside from a trunk transmission system, problems are posed in terms of adjustment of an optical system, cost, and size. In addition, in multi-port reception, the characteristics of the respective reception ports, such as transmission delay time, coupling efficiency, and gain must be matched with each other.

In contrast to this, in (4) polarization scrambling (T. G. Hodgkinson, R. A. Harmon, and D. W. Smith, "Polarization Insensitive Heterodyne Detection Using Polarization Scrambling", Electronics Letters, Vol. 23, No. 10, pp. 513-514, May 1987) or polarization switching (I. M. I. Habbab and L. J. Cimini, Jr., "Polarization-Switching Techniques for Coherent Optical Communications", Journal of Lightwave Technology, Vol. 6, No. 10, pp. 1537-1548, October 1988), the polarization state of signal light or local oscillation light is changed in a time slot of one bit, and an average value is obtained. This method has a receiving sensitivity lower than that of other methods by 3 dB and cannot be applied to a system of a high data rate, but the receivers are much simple. Therefore the method is expected to be applied to a subscriber's system and the like with a relatively low data rate. The following polarization scrambling (switching) light sources have been reported:

(a) a polarization bistable semiconductor laser
(b) a polarization switch using an external modulator (in the method proposed by T. G. Hodgkinson et al.)
(c) a polarization switch using a laser frequency switch (in the method proposed by I. M. I. Habbab et al.)

The polarization bistable semiconductor laser (a), however, cannot be suitably applied to coherent optical communication because the wavelength of output light or the output power generally varies during a polarization switching operation. The external modulator (b) is not suitable for practical applications because it has various drawbacks, e.g., a large insertion loss, a large driving voltage, difficulty in high-speed switching, poor temperature characteristics, poor stability, and low reliability. In addition, the polarization switch based on laser frequency modulation (c) causes an increase in spectrum line width, resulting in difficulty in coherent detection. Since the problems with (a) and (b) seem to be apparent, only the problems with (c) will be described below with reference to the following examples.

In a polarization switching heterodyne receiver using a frequency switch of a local oscillation laser, an oscillation frequency $f_L$ of the local oscillation laser is frequency-modulated by a rectangular wave to become $f_{L1}$ in the first half of a one-bit time slot and $f_{L2}$ in the second half. A local oscillation laser output passes through a polarization maintaining optical fiber of birefringence $B = n_x - n_y$ and is mixed with signal light having a frequency $f_S$ by an optical fiber coupler. A beat signal (IF signal) based on signal light and local oscillation light generated by a photodiode is demodulated into a baseband signal by an IF circuit and a demodulation circuit. In this case, the main axis (x axis) of the polarization maintaining optical fiber is inclined at 45° with respect to the polarization direction of the input local oscillation light. A length L of the polarization maintaining optical fiber is set to be $L = c_0/(2B\Delta f)$ (where $c_0$ is the velocity of light in a vacuum and $\Delta f = f_{L1} - f_{L2}$. If, for example, $B = 5 \times 10^{-4}$ and $\Delta f = 1$ GHz, then L = 300 m.

A phase retardation $\Delta\theta(f)$ between the x- and y-axis polarization components of output light from the polarization maintaining optical fiber is $2\pi LBf/c_0$. The difference in the phase retardation for two frequencies $f_1$ and $f_2$ is given by $$\Delta\theta(f_1) - \Delta\theta(f_2) = \pi \qquad (1)$$

The polarization states ($P_1$, $P_2$) of light having a $\pi$ difference in $\Delta\theta$ are orthogonal. That is, a polarization switch for output light is realized.

In this method, however, a frequency change occurs together with polarization switching of output light. When differential phase shift keying (DPSK) or amplitude shift keying (ASK) is to be performed, the IF frequency can be fixed to $f_{IF} = (f_1 - f_2)/2$ by setting $f_S = (f_1 + f_2)$. In frequency shift keying (FSK), however, two IF frequencies appear in accordance with polarization states. In the above case, since two IF frequencies having a difference $\Delta f = 1$ GHz appear, a wide IF band must be set to cover the two frequencies. For this reason, a frequency deviation of 2 GH or more must be set. In addition, an automatic frequency control (AFC) circuit for stabilizing the IF frequency is inevitably complicated.

The x- and y-axis polarization components of light output from the polarization maintaining optical fiber has a propagating time difference represented by $\tau = LB/c_0 = 1/(2\Delta f)$. When polarization switching is to be performed by this method, in order to sufficiently reduce the time during which light having a frequency $f_1$ and light having a frequency $f_2$ overlap each other, the transmission time difference $\tau$ must be set to be $\tau << T/2$, i.e., the bit rate must be set as $R_B = 1/T << \Delta/2$. In this case, $R_B << 1$ Gb/s. This means that a modulation index m must be set to be large in FSK. For example, at 100 Mb/s, modulation with a frequency deviation of 2 GHz (m=20) is required. The method described above requires a wide IF band and causes a great deterioration in sensitivity and hence is not suitable for practical applications.

Furthermore, since the output power of a semiconductor laser generally varies with frequency modulation, a beat signal is unbalanced between two polarization states, and the output exhibits slight polarization dependency. Although a laser structure and a modulation method may be designed such that frequency modulation can be performed with a constant output, a driving circuit and an output feedback circuit become complicated.

(b) Problems associated with phase noise and receiver band width.

The drawback of the heterodyne detection scheme is that a receiver having a wide band is required because an IF band is used. Especially in transmission at a high bit rate, the band width of a receiver is a bottleneck. In addition, in consideration of the application of the scheme to a subscriber's system, even at a low bit rate, requirement of a wide band for a receiver is not preferable in terms of cost.

In contrast to this, in the homodyne detection scheme which requires no IF band, no demerits are found in terms of a receiver band width. However, the scheme is greatly influenced by phase noise from a light source. In an extreme case, if signal light and local oscillation light have a phase difference of 90°, the reception output is zero. Although the spectrum line width of a semiconductor laser is beginning to be decreased, it is still difficult to realize a full width half maximum of 100 kHz or less without using, e.g., a special feedback loop or an external resonator. Such a feedback loop or an external resonator leads to an increase in the size of a light source, an increase in the number of portions to be adjusted, a deterioration in stability and reliability, and an increase in cost. Even if the line width is reduced by such a means, the phase noise cannot be reduced to zero. For this reason, an optical phase locked loop (optical PLL) is required to match the phase of local oscillation light with that of signal light. Currently, however, such a means is very difficult to realize.

A great deal of attention, therefore, is paid to a phase diversity reception scheme (e.g., L. G. Kazovsky, "Phase- and Polarization-Diversity Coherent Optical Techniques", Journal of Lightwave Technology, Vol. 7, No. 2, pp. 279-292, February 1989) as a scheme capable of receiving signal light in the baseband without using an optical PLL. In this method, components of a plurality of phases of signal light are independently received, and the received components are electrically synthesized in the same manner as in polarization diversity. Similar to a polarization diversity receiver, however, a complicated arrangement is required, and the characteristics of the respective ports must be matched with each other. In the phase diversity reception scheme, the problem of polarization matching is also posed. The arrangement for polarization diversity and phase diversity requires at least four optical receivers.

In order to prevent this problem, phase switching reception may be employed (I. M. I. Habbab, J. M. Kahn, and L. J. Greenstein, "Phase-Insensitive Zero-IF Coherent Optical System Using Phase Switching", Electronics Letters, Vol. 24, No. 15, pp. 974-976, June 1988). Even the phase switching scheme is not free from the problem of polarization matching. In addition, no method of simultaneously performing phase switching and polarization switching has yet been established.

(c) Problems associated with high density optical FDM

The number of channels which can be multiplexed by an optical FDM is determined by a usable frequency (wavelength) band and an allowable channel interval. The frequency band is limited by the tuning range of an local oscillation source or the band of an optical system. Although the tuning range has been increased with the advances in variable-wavelength semiconductor lasers, it is not sufficiently wide yet. A reduction in channel interval is indispensable for the effective use of a wavelength band. Especially in heterodyne reception, the presence of an image component in an IF band limits a channel interval. A reception scheme (image removing receiver) for removing this image component has been proposed. However, if this scheme is combined with polarization diversity, the resulting arrangement is very complicated. Such an image removing receiver is disclosed in Terumi Chikama et al., "Optical Heterodyne Image Rejection Receiver", 1989 Spring National Convention Record, the Institute of Electronics, Information and Communication Engineers of Japan, Part 4, pp. 4-133, 1989. According to this scheme, an optical system has a very complicated arrangement, and an electrical system also has a complicated arrangement with four balanced light receivers. The application of such a scheme to a multichannel optical CATV distribution system or an optical LAN is very difficult in terms of, e.g., reliability and cost.

The problems in the practical application of the coherent optical communication scheme are associated with: (a) polarization matching, (b) phase noise and a receiver band width, and (c) a high density FDM. As methods of solving these problems, the methods based on the following means are regarded to be effective: (A) polarization diversity, (B) phase diversity, and (C) multi-port reception using an image removing receiver and the like. However, in the method based on multiport reception, a complicated arrangement is required, and the characteristics of the respective ports must be matched with each other, thus undesirably restricting allowable characteristic specifications. If two or more of the methods (A), (B), and (C) are to be simultaneously performed, a very complicated arrangement is required. The complication of an optical system causes an increase in the number of portions to be adjusted, a deterioration in reliability, and a great increase in cost and hence poses a serious problem in terms of practical applications. Even in an electronic circuit system, the complication of the arrangement of a high-frequency circuit poses a serious problem, as in hetero-dyne reception.

As other methods of solving the problems (a) and (b), (D) a polarization switching (scrambling) method and (E) a phase switching method have been proposed. In the conventional switching methods, however, a high-speed, low-power-consumption operation is difficult to realize, and the spectrum line width is undesirably increased. Therefore, many limitations are imposed on the application of the methods. For example, it is difficult to apply the methods to FSK. That is the practical value of the methods is low. In addition, the methods exhibit poor compatibility with image removing signal reception.

SUMMARY OF THE INVENTION

It is an object of the present invention to provide a polarization switching light source having a simple arrangement and a small number of limitations.

It is another object of the present invention to provide a light receiver which enables a new image rejection reception scheme based on phase switching without complicating an optical system.

It is still another object of the present invention to provide a coherent light transmission system which has a simple optical system, is not dependent on polarization, and is resistant to phase noise.

The gist of the present invention is that the direct phase modulation technique of a semiconductor laser is used to enable simple, easy, low-cost coherent switching reception in terms of the problems of polarization, phase, and image components.

According to the first aspect of the present invention, there is provided a polarization switching light source comprising (a) a semiconductor laser, (b) means for performing phase modulation by supplying a pulse current to the semiconductor laser, (c) a dividing device for dividing output light from the semiconductor laser into two branch components having substantially the same power, (d) a delay means for delaying one branch component with respect to the other branch component an integer of a phase modulation period, and (e) a mixing means for mixing the two branch components, the polarization axes thereof are set to be orthogonal at the mixing means.

According to the second aspect of the present invention, there is provided an optical receiver comprising (a) a local oscillation source, constituted by the polarization switching light source in the first aspect, the local oscillation source performing polarization switching upon switching of sub-time slots obtained by dividing a time slot T corresponding to a one-bit signal into not less than two portions, (b) a optical receiver for receiving a beat component, resulting from signal light and local oscillation light, as an electrical signal, (c) a detection circuit for detecting a received signal in each sub-time slot, and (d) an adding circuit for adding detection outputs in the respective sub-time slots within the time slot T.

According to the third aspect of the present invention, there is provided an optical receiver comprising (a) a local oscillation source, having means for performing phase modulation by supplying a pulse current to a semiconductor laser, the local oscillation source performing fixed phase switching between $\pi/2$ and $-\pi/2$ upon switching of phase sub-time slots TS obtained by dividing a time slot T corresponding to a one-bit signal into not less than three portions, (b) an optical receiving unit for receiving a beat component, resulting from local oscillation light and signal light, as an electrical signal, (c) means for dividing a beat output from the optical receiving unit into two output components, and delaying one output component with respect to the other output component by a predetermined amount, (d) an electrical 90° hybrid circuit for the two output components, and (f) a detection circuit for detecting an output from the 90° hybrid circuit.

According to the fourth aspect of the present invention, there is provided an optical receiver comprising (a) a local oscillation source, having means for performing phase modulation by supplying a pulse current to a semiconductor laser, the local oscillation source performing fixed phase switching between $\pi/2$ and $-\pi/2$ upon switching of phase sub-time slots obtained by dividing a time slot T corresponding to a one-bit signal into not less than two portions, (b) an optical receiving unit for receiving a beat component, resulting from local oscillation light and signal light, as an electrical signal, (c) means for dividing a beat output from the optical receiving unit into two output components, and delaying one output component with respect to the other output component by a predetermined amount, (d) an electrical 90° hybrid circuit for the two output components, (e) a signal path switching circuit, arranged on a stage before or after the 90° hybrid circuit, the signal path switching circuit switching signal paths of the 90° hybrid circuit in synchronism with a phase sub-time slot, and (f) a detector for detecting a signal passing through the 90° hybrid circuit and the signal path switching circuit.

According to the fifth aspect of the present invention, there is provided a coherent optical transmission system comprising at least one of an optical transmitter and an optical receiver, the first optical transmitter having means for performing phase modulation by supplying a pulse current to a semiconductor laser, and the optical transmitter performing phase switching between $\pi/2$ and $-\pi/2$ upon switching of phase sub-time slots obtained by dividing a time slot T corresponding to a one-bit signal into not less than two portions, and the optical receiver including a local oscillation source constituted by a polarization switching light source in which a timing of polarization switching is set to cause different polarization states to independently appear in the same phase state in one time slot of signal light, an optical receiving unit for receiving a beat component, resulting from light from the local oscillation source and signal light from the optical transmitter, as an electrical signal, a detector for detecting a received signal in each sub-time slot, and means for adding detection outputs in new phase/polarization sub-time slots, which are divided at timings of polarization switching and phase switching and have different polarization and phase states, within a time slot T.

According to the sixth aspect of the present invention, there is provided a coherent optical transmission system capable of performing image rejection signal reception comprising at least one of an optical transmitter and an optical receiver, the optical transmitter having means for performing phase modulation by supplying a pulse current to a semiconductor laser, and the optical transmitter performing phase switching between $\pi/2$ and $-\pi/2$ upon switching of phase sub-time slots obtained by dividing a time slot T corresponding to a one-bit signal into not less than two components, and the optical receiver including a local oscillation source, an optical receiving unit for receiving a beat component, resulting from light from the local oscillation source and signal light from the optical transmitter, as an electrical signal, means for dividing a beat output from the optical receiving unit into two output components, and delaying one output component with respect to the other output component by a predetermine amount, an electrical 90° hybrid circuit for the two output components, and a detector for detecting an output signal from the 90° hybrid circuit.

According to the seventh aspect of the present invention, there is provided a coherent optical transmission system capable of performing image rejection signal reception comprising at least one of an optical transmitter and an optical receiver, the optical transmitter having means for performing phase modulation by supplying a pulse current to a semiconductor laser, and the optical transmitter performing phase switching between $\pi/2$ and $-\pi/2$ upon switching of phase sub-time slots obtained by dividing a time slot T corresponding to a one-bit signal into not less than two components, and the second optical receiver including a local oscillation source, an optical receiving unit for receiving a beat component, resulting from light from the local oscillation source and signal light from the optical transmitter, as an electrical signal, means for dividing a beat output from the optical receiving unit into two output components, and delaying one output component with respect to the other output component by a predetermine amount, an electrical 90° hybrid circuit for the two output components, a signal path switching circuit, arranged on a stage before or after the 90° hybrid circuit, the signal path switching circuit switching signal paths in synchronism with a phase sub-time slot of the optical transmitter, and a detector for detecting a signal passing through the 90° hybrid circuit and the signal path switching circuit.

The optical receiver according to the second, third, or fourth aspect of the present invention further includes a function for inhibiting signal detection at the instant when a frequency variation accompanying a phase variation of local oscillation light appears in an electrical beat signal.

The optical receiver according to the second, third, or fourth aspect of the present invention further includes an AFC function for detecting a difference between a beat frequency and a preset value thereof and controlling an oscillation frequency of a local oscillator to set the beat frequency to be a predetermined value only when a frequency variation accompanying a phase variation of local oscillation light does not appear in a beat signal.

In the optical receiver in the coherent optical transmission system according to the sixth or seventh aspect of the present invention, the local oscillation source has a function, constituted by a polarization switching light source, for adding detection outputs having different polarization states in one time slot.

The optical receiver in the coherent optical transmission system according to the fifth, sixth, or seventh aspect of the present invention further includes a function for detecting a clock by detecting a pulse-like frequency variation accompanying phase switching of the optical transmitter.

In the coherent optical transmission system according to the fifth aspect of the present invention in which the local oscillation source is constituted by a polarization switching optical source, or the coherent optical transmission system according to the sixth or seventh aspect of the present invention which includes a function for adding detection outputs having different polarization states in one time slot, a pulse waveform, a pulse pattern, or a polarity is changed by pulse like frequency modulation for phase switching performed by the optical transmitter and pulse-like frequency modulation for polarization switching performed by the local oscillator of the optical receiver. In addition, the optical receiver includes a function for identifying and detecting a pulse-like frequency variation accompanying polarization switching and a pulse-like frequency variation accompanying phase switching, and a function for controlling the timing of polarization switching by using the detected signals.

The optical receiver in the coherent optical transmission system according to the fifth, sixth, or seventh aspect of the present invention further includes a function for inhibiting signal detection at the instant when a frequency variation accompanying a phase variation of signal light or local oscillation light appears in an electrical beat signal.

In this coherent optical transmission system, the optical receiver further includes an AFC function for detecting a difference between a beat frequency and a preset value thereof and controlling the oscillation frequency of the local oscillator to set the beat frequency to be a predetermined value only when a frequency variation accompanying a phase variation of local oscillation light does not appear in an electrical beat signal.

In a transmission scheme for performing optical frequency multiplexing (optical FDM) transmission by utilizing the coherent optical transmission system according to the sixth or seventh aspect of the present invention, control is performed to match all the timings of phase switching of the respective optical transmitters with each other in the corresponding optical receivers.

In the optical receiver according to the first aspect of the present invention, frequency modulation is performed in a pulse-like manner with a predetermined pulse pattern having a period T by directly supplying a pulse current to the semiconductor laser. In this case, if an angular frequency deviation at time t is represented by $\Delta\omega(t)$, and a pulse is applied in a time interval between $t=t'$ and $t=t'+kg$, then phase modulation represented by the following equation is performed before and after the application of the pulse:

$$\delta\theta = \int_{t'}^{t'+\delta\tau} \Delta\omega(t)dt \quad (2)$$

This semiconductor laser output light is divided into branch components A and B. The propagation time of one branch component A is delayed with respect to the propagation time of the other branch component B by a predetermined time $\tau$. The branch components A and B are then synthesized in such a manner that their polarization states are orthogonal. A phase retardation $\Delta\theta(t)=\Delta A(t)-\Delta B(t)$ between phases $\theta A(t)$ and $\theta B(t)$ of the branch components A and B changes every time phase modulation based on a pulse current appears in the branch component A or B. In this case, since a delay time difference $\tau$ between the two branch components A and B is set to be a fraction of an integer of a period T of phase modulation, a change with a certain pattern periodically occurs at the period T. If light components to be synthesized have substantially the same power, since the polarization state of the synthesized output light changes with $\Delta\theta(t)$, a polarization switching light source can be realized. If a change amount of one switching operation with $\Delta\theta(t)$ is set to be, e.g., $\pi\pm2n\pi$ (n is an integer), two orthogonal polarization states are switched according to equation (1). If the system is adjusted such that the orthogonal polarization states appear at substantially the same probability in the period T, a constant beat can be obtained from light components having arbitrary polarization states in terms of an average time interval.

According to the second aspect of the present invention, there is provided the coherent optical receiver using the polarization switching light source according to the first aspect as a local oscillation source. In this optical receiver, a phase modulation pattern is set such that independent, different polarization states of local oscillation light always appear once or more in the one-bit time slot T of a transmitted signal. Upon this phase modulation, a polarization state is divided into two sub-time slots TS or more. If a beat component, resulting from this local oscillation light and signal light, is received and detected in each sub-time slot, and the detection outputs in the respective subtime slots are added (or averaged) within the time slot T, a signal output having a substantially constant magnitude can be obtained.

According to the third aspect of the present invention, there is provided the image rejection coherent optical receiver using the semiconductor laser capable of direct phase modulation as a local oscillation source.

The local oscillation source performs phase modulation corresponding to an absolute value $\pi/2$ three times or more in the one-bit time slot T. With this phase modulation, a time slot is divided into a plurality of sub-time slots, each having a length $T_S$. A beat component, resulting from this local oscillation light and signal light, is received in each sub-time slot. Assume that the signal light contains a component $\omega_{S1}$ having a frequency higher than a frequency $\omega_L$ of the local oscillation light and a component $\omega_{S2}$ having a frequency lower than the frequency $\omega_L$. The phase of the received beat signal is also shifted by $\pi/2$ in each sub-time slot. Assume that the beat output in the first sub-time slot is represented by $$I_1(t) = A_1\cos((\omega_{S1} - \omega_L)t + \theta_1) + A_2\cos((\omega_L - \omega_{S2})t + \theta_2)$$

where $\theta_1$ and $\theta_2$ are the phase constants based on the difference between the phase of signal light and that of local oscillation light. The beat outputs in the second and subsequent sub-time slots are given by $$I_2(t) = A_1\sin((\omega_{S1} - \omega_L)t + \theta_1) - A_2\sin((\omega_L - \omega_{S2})t + \theta_2)$$

$$I_3(t) = -A_1\cos((\omega_{S1} - \omega_L)t + \theta_1) - A_2\cos((\omega_L - \omega_{S2})t + \theta_2)$$

$$I_4(t) = -A_1\sin((\omega_{S1} - \omega_L)t + \theta_1) + A_2\sin((\omega_L - \omega_{S2})t + \theta_2)$$

If five or more sub-time slots are present, the above-described four states are repeated as $I_5=I_1$, $I_6=I_2$, . . . In this case, $A_1$ and $A_2$ are constants. The signs of the first and second terms of the right-hand side of each equation vary depending on the magnitudes of the frequency of local oscillation light and that of signal light.

This beat output is divided into two components. One component is delayed with respect to the other component by $T_S$. The two components are then added together while the phase of one component is shifted by $\pi/2$. For example, an output $X_1$ obtained by adding one branch component, which is delayed by $T_S$, to the other branch component whose phase is shifted by 90° is represented by $$\begin{aligned}X_1(t) &= A_1\cos((\omega_{S1} - \omega_L)t + \theta_1) + \\ &\quad A_2\cos((\omega_L - \omega_{S2})t + \theta_2) + \\ &\quad A_1\cos((\omega_{S1} - \omega_L)t + \theta_1) - \\ &\quad A_2\cos((\omega_L - \omega_{S2})t + \theta_2) \\ &= 2A_1\cos((\omega_{S1} - \omega_L)t + \theta_1)\end{aligned}$$

As a result, only beat components represented by $\omega_{S1}$ and $\omega_L$ ($\omega_S > \omega_L$) appear. Similarly, outputs from a port X in the subsequent sub-time slots are represented by $$X_2(t) = 2A_1\sin((\omega_{S1} - \omega_L)t + \theta_1)$$
$$X_3(t) = -2A_1\cos((\omega_{S1} - \omega_L)t + \theta_1)$$
$$X_4(t) = -2A_1\sin((\omega_{S1} - \omega_L)t + \theta_1)$$

In contrast to this, if one branch signal of a light receiver output is delayed by $T_S$ and its phase is shifted by 90°, and the resultant signal is added to the other branch signal, then outputs Y obtained in the respective sub-time slots are represented as follows:

$$Y_1(t) = -A_1\sin((\omega_{S1} - \omega_L)t + \theta_1) -$$
$$A_2\sin((\omega_L - \omega_{S2})t + \theta_2) +$$
$$A_1\sin((\omega_{S1} - \omega_L)t + \theta_1) -$$
$$A_2\sin((\omega_L - \omega_{S2})t + \theta_2)$$
$$= -2A_2\sin((\omega_L - \omega_{S2})t + \theta_2)$$
$$Y_2(t) = -2A_2\cos((\omega_L - \omega_{S2})t + \theta_2)$$
$$Y_3(t) = 2A_2\sin((\omega_L - \omega_{S2})t + \theta_2)$$
$$Y_4(t) = 2A_2\cos((\omega_L - \omega_{S2})t + \theta_2)$$

As a result, only beat components represented by $\omega_{S2}$ and $\omega_L$ ($\omega_L > \omega_S$) appear. In order to shift the phase of a signal by 90° regardless of its frequency, a phase shift circuit constituted by a differentiating circuit or an integrating circuit may be used. If such a circuit is to be used, it is preferable that a beat frequency be equal to or higher than the reciprocal of the length of a sub-time slot.

In this case, the outputs detected in the respective sub-time slots are represented as follows:

$$X_0 = X_1^2(t) = X_2^2(t) = X_3^2(t) = X_4^2(t) = PA_1^2$$
$$Y_0 = Y_1^2(t) = Y_2^2(t) = Y_3^2(t) = Y_4^2(t) = PA_2^2$$

That is, signal outputs proportional to power $A_1^2$ and $A_2^2$ of the respective signals can be obtained. In the above equations, P is a constant. Both output ports X and Y need not be arranged, but at least one of them is required.

Assume that the length of a sub-time slot is close to the period of an IF signal. In this case, when an average output in the sub-time slot is to be obtained, the output may vary depending on the phase of the IF signal. In order to prevent this variation, $f_{IF} = \omega_{IF}/2\pi = m/T_S'$ (m = 1, 2, 3 ...) or $1/T_S' < < f_{IF}$ is set, where TS' is the length of a sub-time slot in which outputs are actually detected and averaged.

The optical receiver according to the fourth aspect of the present invention is a modification of the apparatus according to the third aspect. In this modification, the local oscillation source performs phase switching alternately between $\pi/2$ and $-\pi/2$. In the fourth aspect, at least two sub-time slots are required. Under the same conditions as those in the third aspect, the following light receiver outputs alternately appear in the respective sub-time slots:

$$I_1(t) = A_1\cos((\omega_{S1} - \omega_L)t + \theta_1) +$$
$$A_2\cos((\omega_L - \omega_{S2})t + \theta_2)$$

$$I_2(t) = A_1\sin((\omega_{S1} - \omega_L)t + \theta_1) -$$
$$A_2\sin((\omega_L - \omega_{S2})t + \theta_2)$$

This beat output is divided into two branch components. One branch component is delayed with respect to the other branch component by $T_S$, and is added to the other branch component while the phase of one component is shifted by 90°. For example, if a signal obtained by delaying one branch component by TS is added to a signal obtained by shifting the phase of the other branch component by 90°, outputs X obtained in the respective time slots are represented as follows:

$$X_1(t) = 2A_1\cos((\omega_{S1} - \omega_L)t + \theta_1)$$

$$X_2(t) = -2A_2\sin((\omega_L - \omega_{S2})t + \theta_2)$$

Thus, beat components represented by $\omega_{S1}$ and $\omega_L$ ($\omega_S > \omega_L$) and beat components represented by $\omega_{S2}$ and $\omega_L$ ($\omega_L > \omega_S$) alternately appear. Similarly outputs Y obtained by adding one branch component, delayed by $T_S$ and phase-shifted by 90°, to the other branch component which is not delayed are:

$$Y_1(t) = -2A_2\sin((\omega_L - \omega_{S2})t + \theta_2)$$

$$Y_2(t) = 2A_1\cos((\omega_{S1} - \omega_L)t + \theta_1)$$

Therefore, if the output ports X and Y are switched for every sub-time slot, only a component represented by $\omega_S > \omega_L$ or $\omega_L > \omega_S$ can be received. That is, image rejection signal reception can be performed. Note that switching of the signal paths may be performed on the input side of the 90° hybrid circuit instead of performing it on the subsequent stage.

In the second, third, and fourth aspects, when the phase or polarization of local oscillation light is to be switched, the light frequency greatly changes. This may cause an error in signal demodulation or an AFC operation.

In the second, third, and fourth aspects, if the optical receiver further includes a function for inhibiting signal detection at the instant when a frequency variation accompanying a phase variation of local oscillation light appears in an electrical beat signal, an increase in the number of errors in signal demodulation can be prevented because a beat signal in a switching state need not be used for signal demodulation. If the total time required for switching in the time slot T is represented by $\delta T$, since a light output which can be used for reception is given by $(T - \delta T)/T$, a power penalty is caused. However, the power penalty can be reduced by decreasing $\delta T/T$. Similarly, if the light receiver further includes an AFC function for detecting the difference between a beat frequency and a preset value thereof and controlling the oscillation frequency of a local oscillator to set the beat frequency to be a predetermined value only when a frequency variation accompanying a phase variation of local oscillation light does not appear in a beat signal, a frequency variation of the local oscillation source can be suppressed because a beat signal in a switching state need not used for AFC.

According to the fifth aspect of the present invention, there is provided the coherent light transmission system which can simultaneously perform phase switching and polarization switching.

The time slot T corresponding to the reciprocal of a bit rate $R_b$ is divided into two or more phase sub-time slots, and a pulse current is supplied to the semiconductor laser of the light transmitter at the boundary of the phase sub-time slots, thus performing phase modulation of $\delta\theta = \pm\pi/2$. Note that in the following description, alternate signs are assigned in $\delta\theta = \pm\pi/2$. If the light output electric field strength of a phase sub-time slot is represented by $|E_S/\sqrt{2}|\cos(\omega_S t + \theta_S)$, the light output electric field strength of the next sub-time slot is given by $\pm|E_S/\sqrt{2}|\sin(\omega_S t + \theta_S)$. If three or more phase sub-time slots are present, the above-mentioned two states alternately appear. Therefore orthogonal phase components alternately appear in output light from the transmitter.

Output light having a frequency $\omega_L$ from the local oscillation source of the light receiver alternately assumes two orthogonal polarization states upon polarization switching. This defines a polarization sub-time slot. Polarization sub-time slots are set such that two independent polarization states A and B always appear in the respective sub-time slots, in one time slot, which have two independent phase states. Output light with the polarization state A having an electric field strength $|E_L/\sqrt{2}|\cos(\omega_L t + \theta_{LA})$ appears in a polarization sub-time slot A, whereas output light with the polarization state B having an electric field strength $|E_L/\sqrt{2}|\cos(\omega_L t + \theta_{LB})$ appears in a polarization sub-time slot B.

This local oscillation light is mixed with light from the optical transmitter, and the mixed light is received by the optical receiver. If components of signal light power, which have the polarization states A and B are respectively represented by $\xi_A^2$ and $\xi_B^2$, $\xi_A^2 + \xi_B^2 = 1$. In this case, $\xi_A$ and $\xi_B$ satisfy $0 \leq \xi_A \leq 1$ and $0 \leq \xi_B \leq 1$, respectively. At this time, the following beat output components appear in correspondence with phase sub-time slots 1 and 2 and polarization sub-time slots A and B:

$$S_{1A}(t) = P\xi_A |E_S E_L/2| \cos(\omega_{IF} t + \theta_S - \theta_{LA})$$
$$S_{1B}(t) = P\xi_B |E_S E_L/2| \cos(\omega_{IF} t + \theta_S - \theta_{LB})$$
$$S_{2A}(t) = \pm P\xi_A |E_S E_L/2| \sin(\omega_{IF} t + \theta_S - \theta_{LA})$$
$$S_{2B}(t) = \pm P\xi_B |E_S E_L/2| \sin(\omega_{IF} t + \theta_S - \theta_{LB})$$

where P is a constant representing a loss and a conversion efficiency, and $\omega_{IF} = \omega_S - \omega_L$ is an intermediate frequency and may be set to be 0. If this beat output is square-law-detected, the following values are obtained:

$$S_{1A}^2(t) = P^2 \xi_A^2 |E_S E_L/2|^2 \cos^2(\omega_{IF} t + \Delta\theta_A)$$
$$S_{1B}^2(t) = P^2 \xi_B^2 |E_S E_L/2|^2 \cos^2(\omega_{IF} t + \Delta\theta_B)$$
$$S_{2A}^2(t) = P^2 \xi_A^2 |E_S E_L/2|^2 \sin^2(\omega_{IF} t + \Delta\theta_A)$$
$$S_{2B}^2(t) = P^2 \xi_B^2 |E_S E_L/2|^2 \sin^2(\omega_{IF} t + \Delta\theta_B)$$

where $\Delta\theta_A = \theta_S - \theta_{LA}$ and $\Delta\theta_B = \theta_S - \theta_{LB}$. The sum of these detection outputs is $$S^2 = S_{1A}^2 + S_{1B}^2 + S_{2A}^2 + S_{2B}^2$$
$$= P^2 |E_S E_L/2|^2$$

Therefore, even at $\omega_{IF} \sim 0$, signal reception can be performed regardless or the phase difference between signal light and local oscillation light, and this signal reception does not depend on the polarization state of signal light in the optical receiver.

In practice, although the phase of the light source varies depending on the phase noise over time, no significant penalty is caused as long as a phase variation in the time slot T is sufficiently small. In general, a polarization state gradually varies as compared with the time slot T. If the frequency $f_{IF}$ is sufficiently low, no problems are posed. If, however, the length $T_S$ of a sub-time slot determined by a phase and polarization is close to the period of the IF frequency, an output change occurs in the sub-time slot. If one representative value is obtained from the average output, the output varies depending on the phase of the IF frequency. In order to prevent this variation, $f_{IF} = m/T_S'$ (m = 1, 2, 3 ...) may be set where $T_S'$ is the length of a sub-time slot in which outputs are actually detected and an average value is obtained.

According to the sixth aspect of the present invention, there is provided the coherent optical transmission system which performs phase switching with image rejection signal reception according to the third aspect by using the optical transmitter in place of the local oscillation source. The operation principle of this system is the same as that of the system according to the third aspect except that phase switching is performed by the optical transmitter instead of the local oscillation source. Note that an image component must also be phase-switched in synchronism with a desired signal component in the same manner.

According to the seventh aspect of the present invention, there is provided the coherent optical transmission system which performs phase switching with image rejection signal reception according to the fourth aspect by using the optical transmitter in place of the local oscillation source. The operation principle of this system is the same as that of the system according to the fourth aspect except that phase switching is performed by the optical transmitter instead of the local oscillation source. Note that an image component must also be phase-switched in synchronism with a desired signal component in the same manner.

The local oscillation source is constituted by a polarization switching light source and has a function for adding detection outputs with different polarization states in one time slot. The light receiver of the coherent optical transmission system according to the sixth or seventh aspect is used for the coherent optical transmission system constituted by a combination of the image rejection function and the polarization switching function according to the second aspect. In this case, if phase switching for removing image components is performed by the optical transmitter while polarization switching is performed by the local oscillation source, image rejection signal reception can be performed without depending on the polarization state of signal light reaching the optical receiver.

According to the fifth, sixth, or seventh aspect of the present invention, there is provided the coherent optical transmission system wherein the optical receiver further includes a function for detecting a clock by detecting a pulse-like frequency variation accompanying phase switching of the optical transmitter, thus extracting a clock from a frequency variation of an optical signal. When a clock is to be extracted from a signal, since no periodic component appears in a clock if the value of the signal does not change, it is difficult to perform stable clock extraction. In the systems according to the fifth, sixth, and seventh aspects, signal light is frequency-modulated in the form of a pulse to perform periodic phase switching regardless of the value of the signal. By using such signal light, a stable clock extracting operation can be performed regardless of the value of a signal.

The coherent optical transmission system according to the fifth aspect of the present invention in which the local oscillation source is constituted by a polarization switching light source, or the coherent optical transmission system according to the sixth or seventh aspect, which has a function for adding detection outputs with different polarization states in on time slot, includes a function for changing a pulse waveform, a pulse pattern, or a polarity by means of pulse-like frequency modulation for phase switching performed by the optical transmitter and pulse-like frequency modulation for polarization switching provided for the local oscillator of the optical receiver. In addition, the optical receiver includes a function for identifying and detecting a pulse-like frequency variation accompanying polarization switching and a pulse-like frequency variation accompanying phase switching, and a function for controlling the timing of polarization switching by using the detected signal. In this case, since the signal light is frequency-modulated in the form of a pulse for phase switching while the local oscillation light is frequency-modulated in the form of a pulse for polarization switching, both pulses appear in the beat signals. If the waveform, pulse pattern, or polarity of each frequency-modulated pulse is changed in advance, the two types of frequency modulation can be discriminated from each other upon detection of a frequency variation, thus allowing control of the timing of polarization switching, extraction of a clock, and the like.

In the coherent optical transmission system according to the fifth, sixth, or seventh aspect of the present invention, when the phase or polarization of local oscillation light or signal light is to be switched, an optical frequency greatly varies, resulting in a signal demodulation error or an AFC operation error. For this reason, the system further includes a function for inhibiting signal detection at the instant when a frequency variation accompanying the phase variation of signal light or local oscillation light appears in an electrical beat signal. In this system, a beat signal in a switching state is not used for signal demodulation so as to prevent an increase in the number of errors in signal demodulation. If the total period of time required for switching in the time slot T is represented by $\delta T$, since a light output used for signal reception becomes $(T-\delta T)/T$, a power penalty is caused. However, by sufficiently reducing $\delta T/T$, the power penalty can be reduced. Similarly, in the system further including the AFC function for detecting the difference between a beat frequency and its preset value and controlling the oscillation frequency of the local oscillator to set the beat frequency to be a predetermined value only when a frequency variation accompanying the phase variation of local oscillation light does not appear in an electrical beat signal, a beat signal in a switching state is not used for AFC of the local oscillation source to suppress the frequency variation of the local oscillation source.

If the optical receiver of the coherent optical transmission system according to the fifth, sixth, or seventh aspect of the present invention is applied to an optical FDM, since the optical frequency greatly changes upon switching of the phase of signal light, this frequency change may interfere with a signal in another channel. In addition, in the systems according to the sixth and seventh aspects, if switching of the phase of an image signal adjacent to a desired signal is not performed in the same manner as that of the phase of the desired signal, an image removing operation cannot be performed. This problem can be solved by synchronizing the phase switching operations of the respective optical transmitters. Frequency variations simultaneously occur in the respective channels. Therefore, a signal error in a given channel due to a frequency variation in another channel can be prevented by combining a function for synchronizing phase switching and a function for inhibiting signal detection at the instant when a frequency variation accompanying the phase variation of signal light or local oscillation light appears in an electrical beat signal. In addition, a combination of the function for synchronizing phase switching and the above-mentioned AFC function can prevent an AFC error in a given channel due to a frequency variation in another channel. Furthermore, in the system according to the sixth or seventh aspect, image rejection signal reception can be performed through any channels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a schematic arrangement of a polarization switching light source according to an embodiment of the present invention;

FIGS. 3A to 3L are graphs for explaining the operation principle of the polarization switching light source in FIG. 1;

FIGS. 6A to 6D are graphs for explaining the second modulation method of the polarization switching light source;

FIGS. 13A and 13B are block diagrams showing a schematic arrangement of a coherent optical transmission system according to an embodiment of still another aspect of the present invention.

DETAILED DESCRIPTION OF THE PREFERRED EMBODIMENTS

Figure 2A:
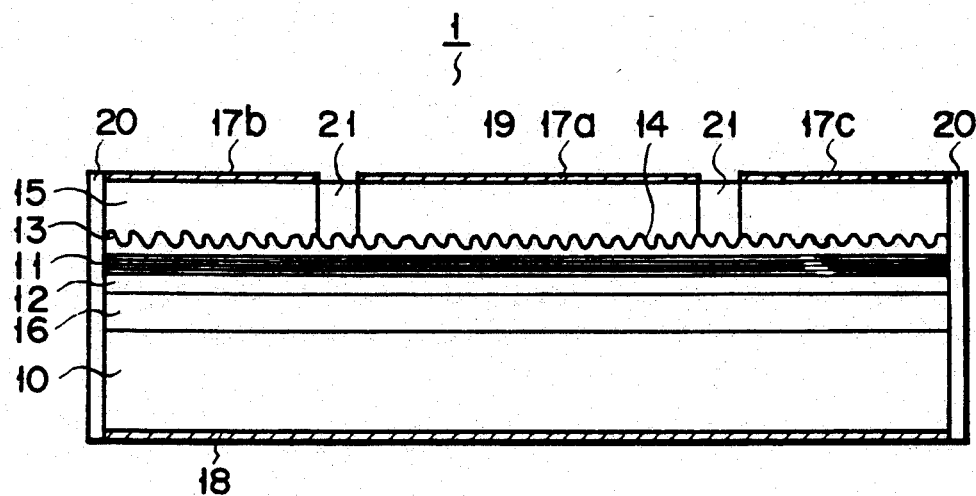
FIGS. 2A and 2B are views for explaining the structure and operation of a semiconductor laser used in the embodiment in FIG. 1.

Embodiments of the polarization switching light source, optical receiver, and coherent optical transmission system of the present invention will be sequentially described below with reference to the accompanying drawings.

First Embodiment: Polarization Switching Light Source

As shown in FIG. 1, this polarization switching light source comprises a semiconductor laser 1, a driver 2 for supplying a bias current and a pulse current to the semiconductor laser 1, a lens 3 for collimating output light from the semiconductor laser 1, an optical isolator 4 having an isolation ratio of 60 dB or more, a 1:1 beam splitter 5 for splitting output light from the optical isolator 4 into two branch components, an optical system 6 for adjusting the lengths of the two optical paths, split by the beam splitter 5, to have a predetermined optical path difference $\delta 1$, a $\lambda/2$ plate 7 for rotating the polarization of one branch component through 90°, a polarization beam splitter 8 for synthesizing the two branch components, an optical system and a laser stabilizing system accompanying these components, and the like. The components from the beam splitter 5 to the polarization beam splitter 8 constitute an optical system 9 similar to a Mach Zehnder interferometer. This optical system 9 is characterized in that one branch light component is delayed, and when the two branch light components are synthesized, their polarization states are orthogonal to each other.

The semiconductor laser 1 used in this case is a three-section phase-shifted distributed feedback (DFB) InGaAs/InGaAsP multiple quantum well (MQW) semiconductor laser having a cavity length of 1.5 mm and formed on an n-InP substrate 10, as shown in FIG. 2A. An active layer 11 has a multiple quantum well structure having 12 wells, which is formed by alternately stacking InGaAs layers 11a, each having a width of 7.0 nm, and InGaAsP (a composition for a wavelength of 1.3 μm) barrier layers 11b, each having a width 8.0 nm. Optical waveguides 12 and 13 are formed on the lower and upper surfaces of this multiple quantum well active layer 11, while a first order diffraction grating 14 is formed on one waveguide 13. The active layer 11 and the optical waveguides 12 and 13 are formed between a p-InP cladding layer 15 and an n-InP cladding layer 16. Holes and electrons are respectively injected from upper and lower electrodes 17 and 18 into the active layer 11 and the optical waveguides 12 and 13 through the cladding layers 15 and 16. A $\lambda/4$-phase shift region 19 is formed in a diffraction grating portion in the middle of the semiconductor laser 1. On both facets of the semiconductor laser 1, anti-reflection coatings 20, each having a reflectivity of 0.3% or less with respect to a laser beam, are formed. The upper electrode is constituted by a central portion 17a having a length of about 700 μm and two end portions 17b and 17c, each having a length of about 400 μm. High-resistance regions 21, each having a width of 4 μm, are formed between the respective electrode portions. Each region 21 has a resistance of 1 MΩ or more. The semiconductor laser 1 is mounted on a heat sink and is packaged together with a Peltier element and a thermal sensor. The temperature of the semiconductor laser 1 is stabilized with a precision of ±0.01° C. by a temperature feedback circuit.

Figure 2B:
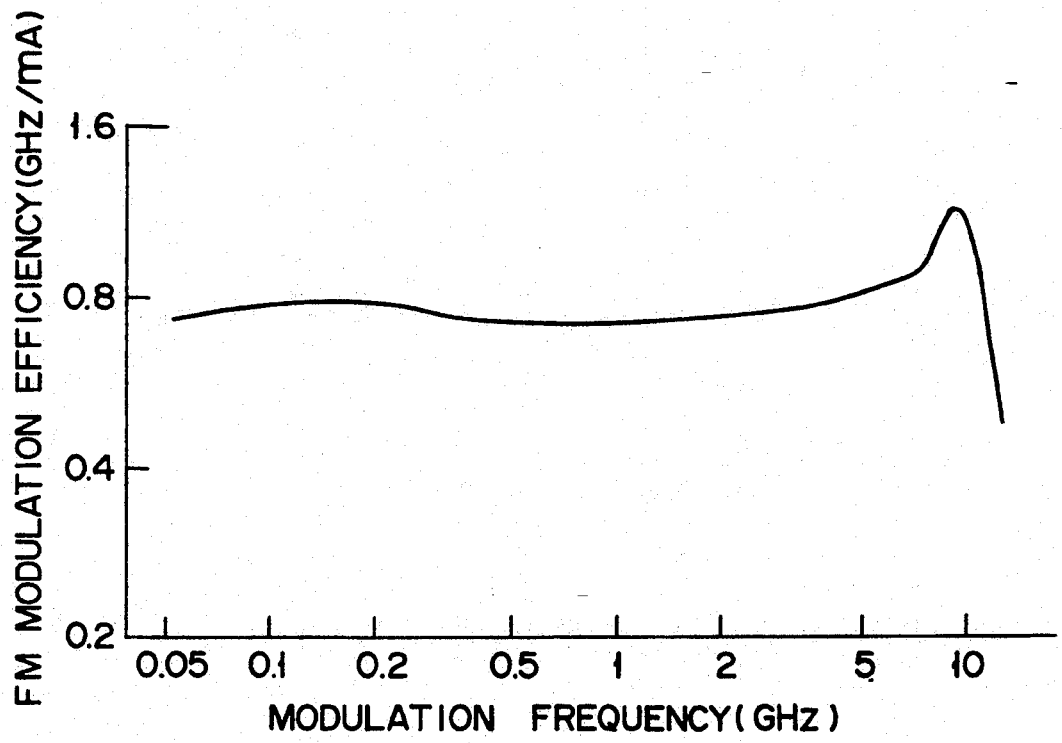

In this semiconductor laser 1, by adjusting a bias current to be supplied to each electrode, an FM modulation efficiency exhibiting a flat curve of about 0.8 GHz/mA in the range of modulation frequencies from 100 kHz to 15 GHz is obtained, as shown in FIG. 2B. At this time, an FM modulation current is supplied to only the central electrode 17a of the semiconductor laser 1. The semiconductor laser 1 oscillates in a single mode having a wavelength of about 1.55 μm while it is biased in this manner. The oscillated light is linear polarization light. A side mode suppression ratio is controlled to be 40 dB or more; and an oscillation spectrum full-width half maximum, 1 MHz or less, owing to the effects of suppression of return light by means of the optical isolator 4, temperature stabilization, bias current stabilization, and packaging resistant to external conditions, in addition to the superior characteristics of the semiconductor laser 1.

FIG. 3A shows the waveform of a pulse current to be supplied to the central portion of the semiconductor laser 1 through the driver 2. Positive and negative current pulses, each having an amplitude of 3.125 mA and a width $\delta\tau = 100$ ps, are alternately applied every $\tau/2 = 500$ ps. As a result, as shown in FIG. 3B, a laser oscillation frequency of 2.5 GHz is modulated into alternate positive and negative pulses, each having the width $\delta\tau$. If this modulated signal is expressed as the phase of a center oscillation frequency, switching occurs between 0 and $\pi/2$ every $\tau/2$, as shown in FIG. 3C. For the sake of descriptive convenience, the above-mentioned ideal pulse waveform is assumed in the following description. The gist of this embodiment, however, is that the phase of output light is switched between 0 and $\pi/2$ within a period of time shorter than $\tau/2$. Therefore, the present invention is not limited to the above-mentioned modulated waveforms of the current and oscillation frequency. In practice, since it is difficult to obtain the modulated waveform of a current or an oscillation frequency as a perfect rectangular wave, the driver 2 is adjusted such that the phase of output light is changed between 0 and $\pi/2$ within a short period of time every $\tau/2$, as shown in FIG. 3C. The light electric field of the output light at this time can be expressed as $$E_0 = \sqrt{2}\, |E_0| \cos(\omega t + \theta(t))$$

where $\omega$ is the oscillation light angular frequency, and $\theta(t)$ is the phase shown in FIG. 3C:

$$\theta(t) = \begin{cases} 0 & (0 \leq t - m\tau \leq \tau/2 - \delta\tau) \\ \pi/2 & (\tau/2 \leq t - m\tau \leq \tau - \delta\tau) \end{cases}$$

where m is an integer. Between $t - m\tau = \tau/2 - \delta\tau \sim \delta\tau$ and $\tau - \delta\tau \sim \tau$, the phase continuously changes between these values.

The optical path difference k1 of the optical system 9 is set such that one optical path B is delayed with respect to the other optical path A by $\tau/2$. With a delay of $\tau/2 = 500$ ps, if the optical paths are in the air, the optical path difference $\delta 1$ is 15 cm according to the following equation:

$$\delta 1 = c_0 \times (\tau/2)$$

where $c_0$ is the velocity of light in a vacuum. If a light electric field $E_A$ generated by the polarization beam splitter 8 in the optical path A is represented by $$E_A = |E_0|\cos(\omega t + \theta(t) + \phi_A)$$
$$|E_0|\cos(\omega t + \theta_A(t))$$

then, a light electric field $E_B$ generated by the polarization beam splitter 8 in the optical path B is given by $$E_B = |E_0|\cos(\omega(t - \tau/2) + \theta_A(t - \tau/2) + \phi_B)$$
$$|E_0|\cos(\omega t + \theta_B(t))$$

where $$\delta\phi = \phi_B - \omega\tau/2 \, (-\pi < \delta\phi \leq \pi)$$

$$\theta_B(t) = \theta_A(t - \tau/2) + \delta\phi$$

Figure 3D:
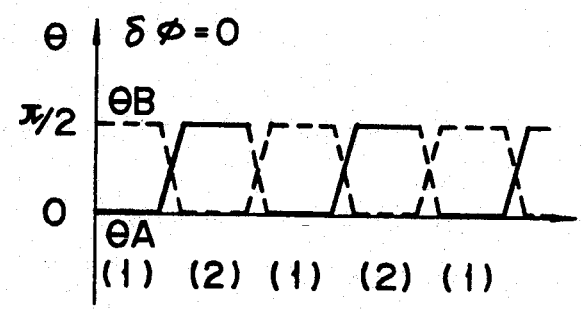
Figure 3E:
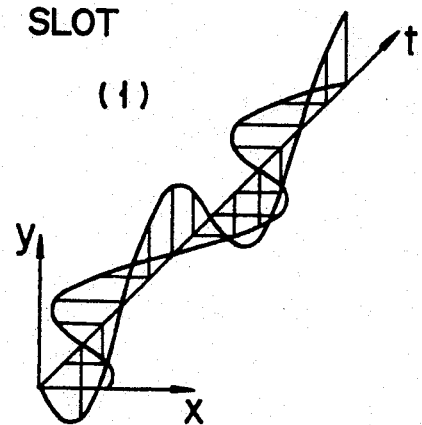
Figure 3F:
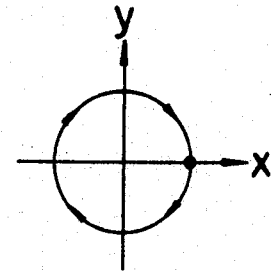
Figure 3G:
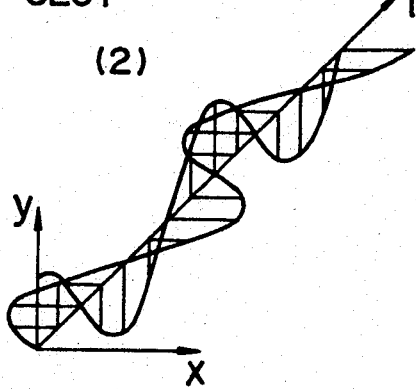
Figure 3H:
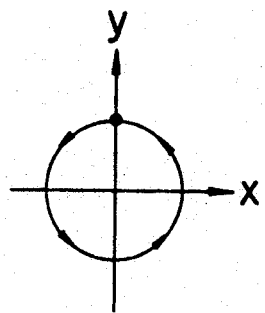
Figure 3I:
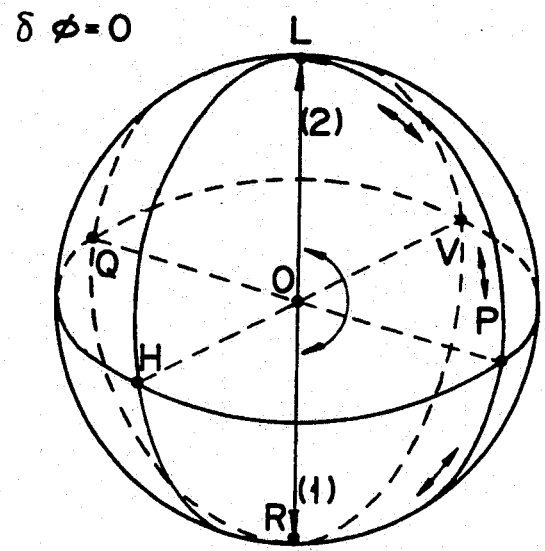
Figure 3J:
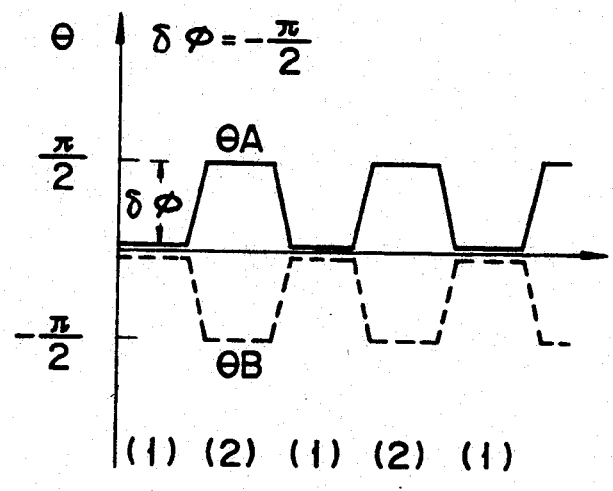
Figure 3K:
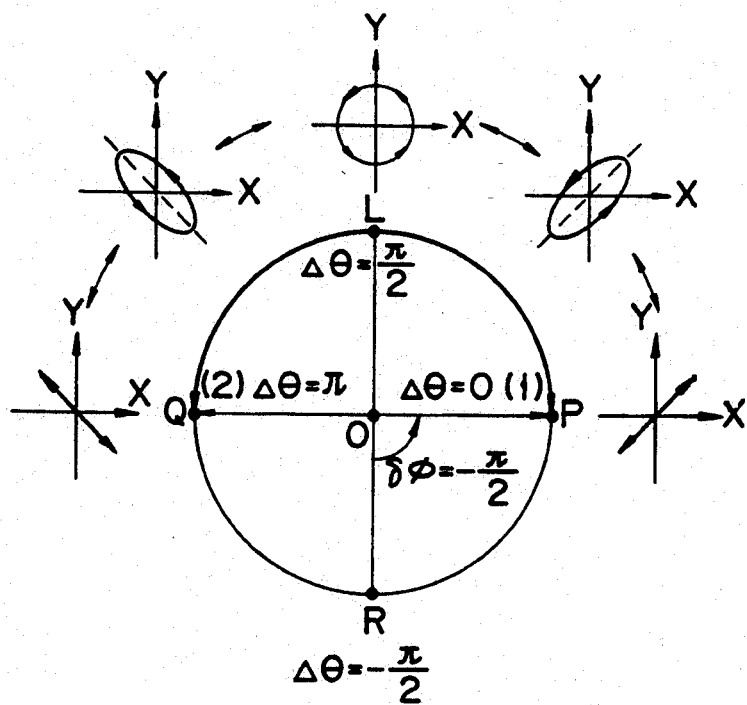
Figure 3L:
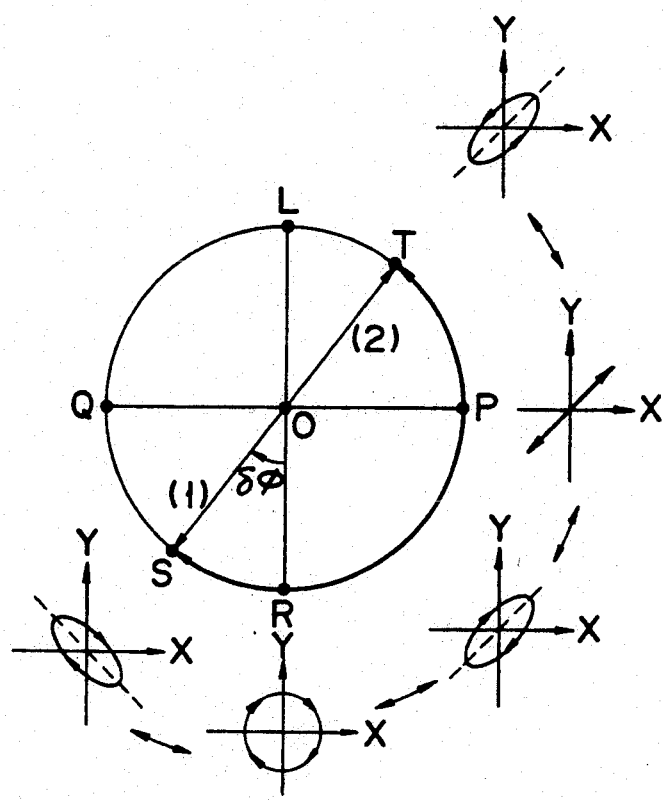

In this case, the phase $\phi_A = 0$ is set for the sake of descriptive convenience. Assume that the light electric fields $E_A$ and $E_B$ are respectively polarized in the x and y directions. A phase difference $\delta\phi$ between the optical paths A and B changes from $-\pi$ to $\pi$ every time the optical path difference $\delta l$ changes in accordance with a wavelength period. FIG. 3D is a graph showing $\theta_A(t)$ (solid curve) and $\theta_B(t)$ (dotted curve) when $\delta\phi = 0$. FIGS. 3E and 3F, and 3G and 3H show the states of the electric fields of polarization beam splitter output light in time slots (1) and (2). As is apparent from FIGS. 3E to 3H, the output light is switched between two orthogonal polarization states, i.e., right-circularly polarized light and left-circularly polarized light every $\tau/2$. However, an intermediate polarization state appears between $0 < t - m\tau < \tau/2 - \delta\tau$ and $\tau/2 < t - m\tau < \tau - \delta\tau$ (m is an integer). FIG. 3I shows this state expressed on the Poincaré sphere, which is based on the expression in S. C. Rashleigh, Journal of Lightwave Technology Vol. LT-1, No. 2, pp. 312-331, June 1983. Since the light electric fields $E_A$ and $E_B$ have the same amplitude, the polarization state of the synthesized output light is present on a PLQR circular cross section. If $$\Delta\theta(t) = \theta_A(t) - \theta_B(t)$$

then, $\Delta\theta$ corresponds to a polarization angle measured from a point P toward a point L. Two polarization states located at positions symmetrical about an origin O on this circumference are orthogonal to each other. In this case, the two polarization states correspond to right-circularly polarized light R ($\Delta\theta = -\pi/2$) in time slot (1) and left-circularly polarized light L ($\Delta\theta = \pi/2$). In switching, the polarization states reciprocate on an RPL semicircle. FIG. 3J shows $\theta_A(t)$ (solid curve) and $\theta_B(t)$ (dotted curve) when $\delta\phi = -\pi/2$. FIG. 3K is a graph showing the polarization state of output light, in which the polarization state is switched between two orthogonal linear polarization states P and Q respectively inclined as 45° and $-45°$ with respect to the x axis, as P$\leftrightarrow$L$\leftrightarrow$Q, every $\tau/2$. Similarly, when $\delta\phi = \pi$, two circular polarization states alternately appear every $\tau/2$, whereas when $\delta\phi = \pi/2$, two orthogonal linear polarization states alternately appear every $\tau/2$. Otherwise, the output light is elliptically polarized. In this case, since the difference between $\Delta\theta = \theta_A - \theta_B$ for $0 < t - m\tau < \tau/2 - \delta\tau$ and $\Delta\theta$ for $\tau/2 < t - m\tau < \tau - \delta\tau$ is $\pi$, two orthogonal elliptical polarization states appear every $\tau/2$. That is, as shown in FIG. 3L, polarization states alternately appear at two points S and T symmetrical about the center on a PLQR circumference. In general, therefore, when light which is phase-modulated as shown in FIG. 3C is transmitted through the optical system 9, the output light alternately exhibits two orthogonal polarization states every $\tau/2$, thereby realizing a polarization switching light source for switching two orthogonal polarization states at a period $\tau$.

In the modulation method of the polarization switching light source of this embodiment, it is important to set the time during which one of two orthogonal polarization states appears to be equal to the time during which the other polarization state appears. The conditions for this setting will be clarified below. The probability that $\Delta\theta(t) = \theta_A(t) - \theta_B(t)$ becomes $\Delta\theta_0$ within $t = 0 \sim \tau$ is defined as a phase difference probability density function $Pr(\Delta\theta_0)$. In this case, assume that the variable $\Delta\theta_0$ of $Pr(\Delta\theta_0)$ takes a value satisfying $-\pi < \Delta\theta_0 \leq \pi$ as a principal value. In addition, assume that $$\int_{-\pi}^{\pi} Pr(\Delta\theta)d(\Delta\theta) = 1$$

If $\Delta\theta_1$ is an arbitrary phase difference, an output polarization state for $\Delta\theta = \Delta\theta_1$ and an output polarization state for $\Delta\theta = \Delta\theta_1 \pm \pi$ are orthogonal to each other. Therefore, if $$Q(\Delta\theta) = Pr(\Delta\theta) - Pr(\Delta\theta + \pi)$$

is 0 for all values of $\Delta\theta$, polarization states appearing between 0 and $\tau$ equally take two orthogonal polarization states. That is, the probabilities that polarization states appear at two points symmetrical about the center on the PLQR circumference become equal, and a perfect polarization switching state can be realized. In the above-described modulation method, however, unless $\delta\tau = 0$, polarization states at transient portions where phases are switched do not cancel each other, as shown in FIGS. 3G, 3I, and 3J. That is, an imperfect polarization switching light source is formed. However, if $\delta\tau$ is sufficiently shortened to reduce $$R = \int_{-\pi}^{\pi} |Q(\Delta\theta)|d(\Delta\theta)/2$$

to a value sufficiently smaller than 1, the above-described apparatus can be used as a polarization switching light source in practice. It is preferable to set $R < 0.25$ in practice. In this embodiment, $R \sim 0.2$.

Note that upon modulation, the time-averaged laser oscillation spectrum line width is increased. This increase causes phase discontinuity of a beat signal, over time, when beating is caused between different monochromatic light components having similar frequencies and predetermined polarization states and phases. That is, in general, the phase of a beat signal as well as its amplitude vary from time slot (1) to time slot (2). The phase variation of the beat signal is dependent on the polarization states of different monochromatic light components. If $\delta\tau$ is prolonged, a phase variation per unit time in a transient portion is reduced, and the average spectrum line width is increased. If $\delta\tau$ is shortened, the phase variation becomes steep, the spectrum line width is reduced but a sideband is produced at a remote position.

The speed of direct modulation of the semiconductor laser can be easily increased as compared with a case wherein an external phase modulator is used. In addition, the polarization switching light source requires only a small driving current of several mA for a switching operation, and hence the load of the driver is small as compared with a high-speed external phase modulator requiring a driving voltage of several V or more. The switching frequency ($f_{sc}=1/\tau$) of the polarization switching light source of this embodiment is 1 GHz. Note that if the period of polarization switching is sufficiently short as compared with the changing speed of a target phenomenon, this polarization switching light source can be regarded as a polarization scrambling light source.

Figure 4:
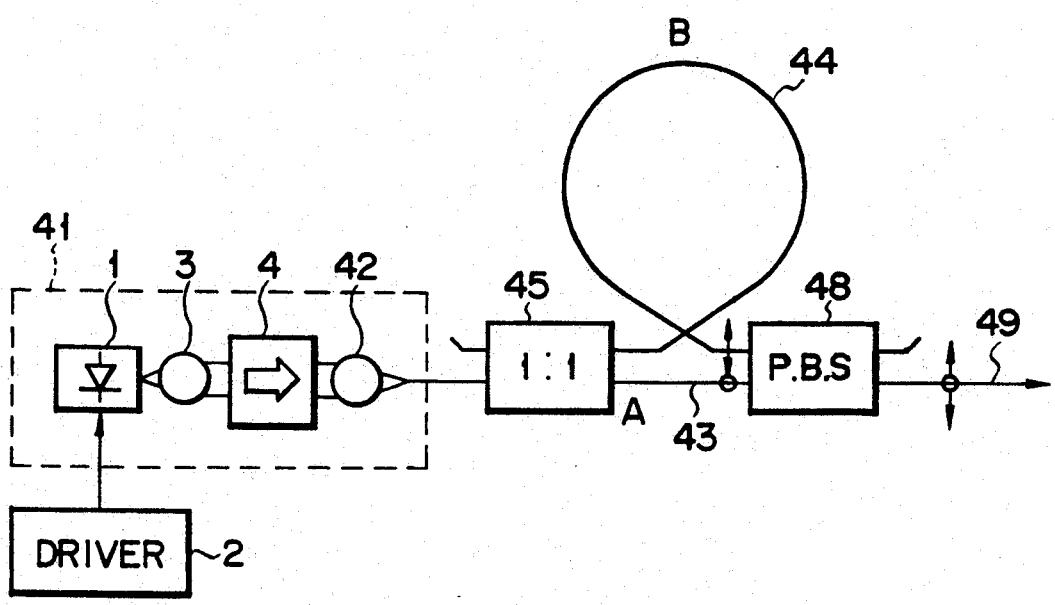
FIG. 4 is a block diagram showing a polarization switching light source as a module.

FIG. 4 shows a module equivalent to the polarization switching light source in FIG. 1. A semiconductor laser 1, a lens 3, and an optical isolator 4 are housed in a module 41 together with a Peltier element. The semiconductor laser 1 is basically the same as that shown in FIG. 2A. Output light from the optical isolator 4 is coupled with polarization matching to the input fiber of a 1:1 polarization maintaining fiber coupler 45 through a spherical lens 42. Each output of the fiber coupler 45 is connected to one end of each of two polarization maintaining optical fibers 43 (optical path A) and 44 (optical path B). The other end of each of the polarization maintaining optical fibers 43 and 44 is connected to a fiber-optic polarization beam splitter (working as a coupler) 48 such that the polarization main axes are perpendicular to each other. The fiberoptic polarization beam splitter 48 is designed to transfer almost 100% of the light polarized in x axis from one optical fiber to the other optical fiber and to leave almost 100% of the light polarized in y axis from the other optical fiber in the same optical fiber. Therefore, light components propagating through the two polarization maintaining optical fibers 43 and 44 are output from a single fiber 49. The polarization maintaining optical fiber 44 is longer than the polarization maintaining optical fiber 43 by $\delta l=(c_0/n_{eff})\times(\tau/2)$. For this reason, in the fiber-optic polarization beam splitter 48, light propagating through the optical path B 44 is delayed with respect to light propagating through the optical path A 43 by $\tau/2=500$ ps. The value of $\delta l$ is 10 cm, provided that an equivalent refractive index $n_{eff}$ of an optical fiber is 1.5. The modulation method, operation, and effect of the semiconductor laser 1 are the same as those in the previous embodiment.

Note that the range of components to be formed into a module is not limited to that described above. For example, the range may include the fiber couplers 45 and 48 and the optical fibers 43, 44, and 49. The optical fibers may be integrated with the module in the form of a pigtail. In addition, the fiber-optic polarization beam splitter need not be used to synthesize two branch light components. For example, a 10:1 polarization beam splitter or a normal polarization-independent optical coupler may be used. In this case, feedback control of polarization switching can be performed by using the other fiber output light. The semiconductor laser 1 is not limited to the one shown in FIG. 2A but various types of semiconductor lasers, e.g., a DBR laser, an external resonator laser, a double-hetero laser, and a strained quantum well laser, can be used. As a material for a semiconductor laser, various combinations of substances, such as GaAs/AlGaAs, GaAs/InGaAlP, and GaSb/GaAlSb, can be used. Therefore, the apparatus can be applied to various types of light, e.g., visible light and infrared light.

Various modulation methods are available as modulation methods of performing polarization switching with the arrangement of the polarization switching light source of the present invention.

Figure 5A:
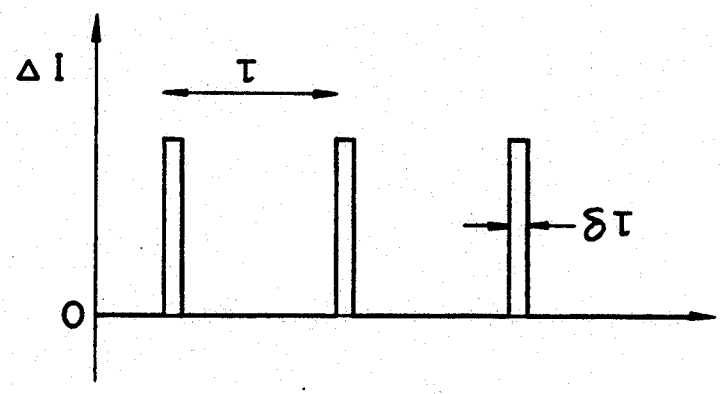
FIGS. 5A to 5C are graphs for explaining the first modulation method of the polarization switching light source.
Figure 5B:
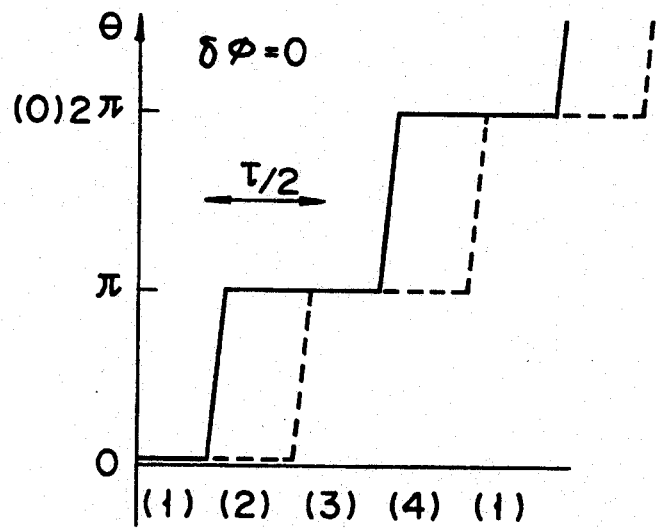
Figure 5C:
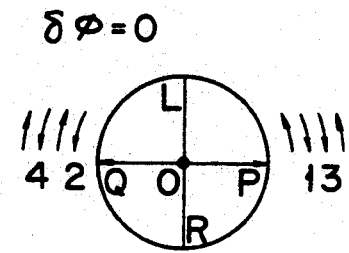

A modulation method for the polarization switching light source will be described below with reference to FIGS. 5A to 5C. FIG. 5A shows the modulation waveform for an oscillation frequency. In this case, frequency modulation of a frequency deviation of 5 GHz is performed over a width $\delta\tau=100$ ps at intervals of $\tau=1$ ns. The phase of local oscillation light is changed by $\pi$ before and after the application of the pulse. Since a branch light component propagating through the optical fiber 44 is delayed by $\tau/2$ in the optical system, phases $\theta_A(t)$ and $\theta_B(t)$ of light electric fields synthesized by the fiber optic polarization beam splitter (working as a coupler) 48 appear as shown in FIG. 5B, similar to the above-described case. In this case, $\delta\phi=0$ is assumed. As a result, $\Delta\theta(t)=\theta_A(t)-\theta_B(t)$ is switched between 0 and c every $\tau/2$. Since the polarization states of the light components from the optical paths A and B are perpendicular to each other in the coupler 48, two orthogonal linearly polarized light components alternately appear at the output of the coupler 48 every $\tau/2$. Similarly, in the case of $\delta\phi\neq 0$, $\Delta\theta$ changes by $\pi$ every $\pi/2$, and two orthogonal circularly or elliptically polarized light components alternately appear. Therefore, a polarization switching light source can be realized regardless of the value of $\delta\phi$. However, as FIG. 5C shows changes in polarization state on a PLQR circular cross section of the Poincaré sphere, although the polarization states in time slots (1) and (3) are the same, the phase is changed by $\pi$, i.e., inverted. Similarly, the polarization states in time slots (2) and (4) are the same, but the phase is inverted. This modulation method is different from that described above in this regard.

Figure 7A:
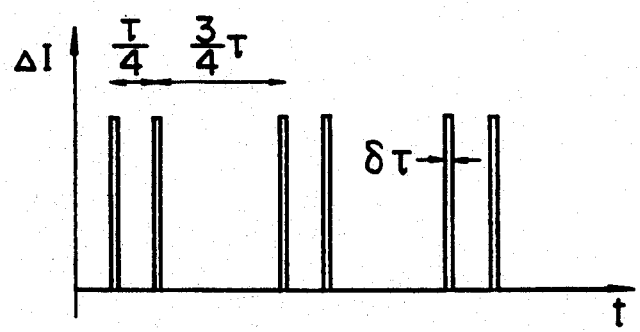
FIGS. 7A to 7C are graphs for explaining the third modulation method of the polarization switching light source.
Figure 7B:
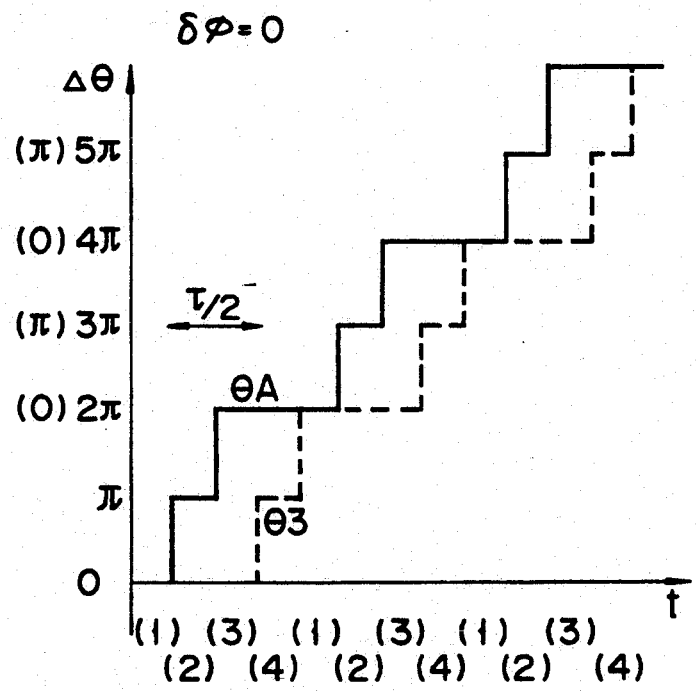
Figure 7C:
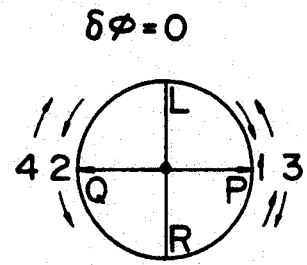
Figure 8A:
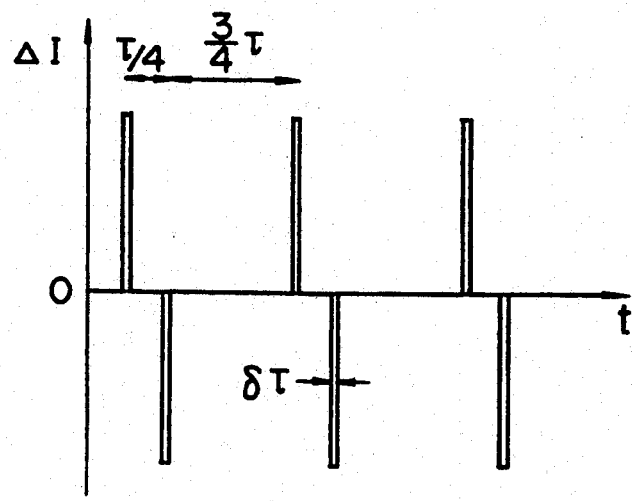
FIGS. 8A to 8C are graphs for explaining the fourth modulation method of the polarization switching light source.
Figure 8B:
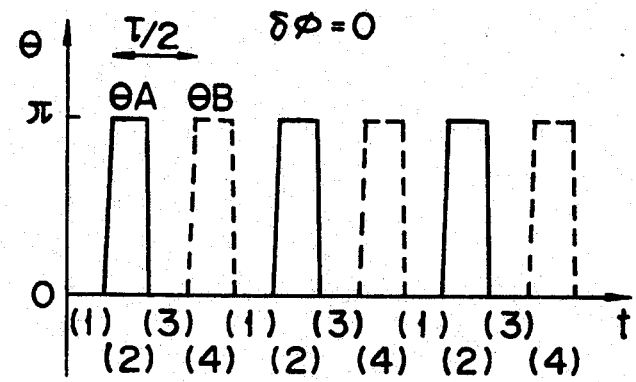
Figure 8C:
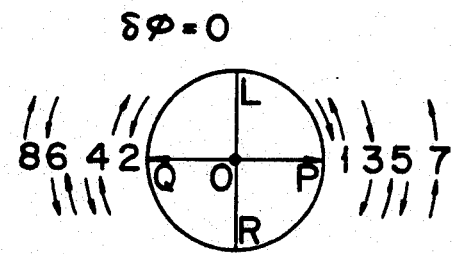

The conditions for obtaining a perfect polarization switching light source are described above. Three modulation methods which satisfy the conditions will be described below with reference to FIGS. 6A to 6D, FIGS. 7A to 7C, and FIGS. 8A to 8C, respectively. Assume that the arrangement of an optical system employed in each case is the same as that shown in FIG. 4. FIGS. 6A, 7A, and 8A respectively show laser modulation current waveforms. FIGS. 6B, 7B, and 8B respectively show phases $\theta_A(t)$ and $\theta_B(t)$ of light electric fields synthesized by the fiber-optic polarization beam splitter 48. FIGS. 6C, 7C, and 8C respectively show changes in polarization state on a PLQR circular cross section of the Poincaré sphere. In each case, a phase difference probability density function $Pr(\Delta\theta)$ shown in FIG. 6D is obtained, and hence $R=0$. Therefore, two orthogonal polarization states equally appear in a transient state between 0 and $\tau$. However, phase inversion occurs between time slots (2) and (4). In the cases shown in FIGS. 6A to 6C, 7A to 7C, and 8A to 8C, $\delta\phi=0$ is assumed. However, similar to the above-described case, polarization switching can be realized even if $\delta\phi\neq 0$.

Figure 9A:
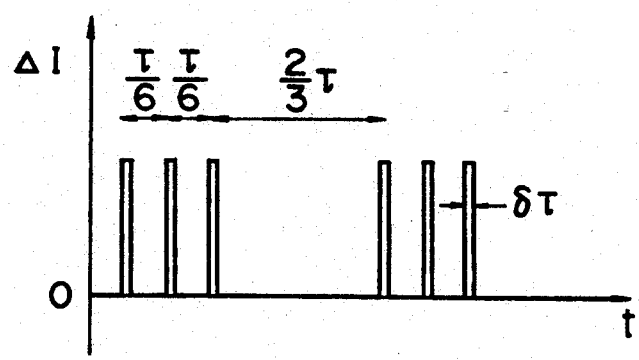
FIGS. 9A and 9B are graphs for explaining the fifth modulation method of the polarization switching light source.
Figure 9B:
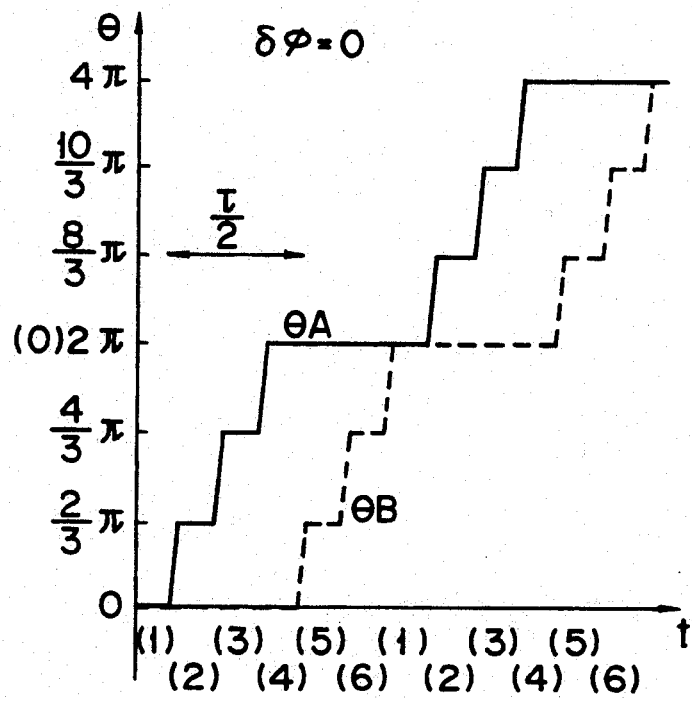
Figure 10A:
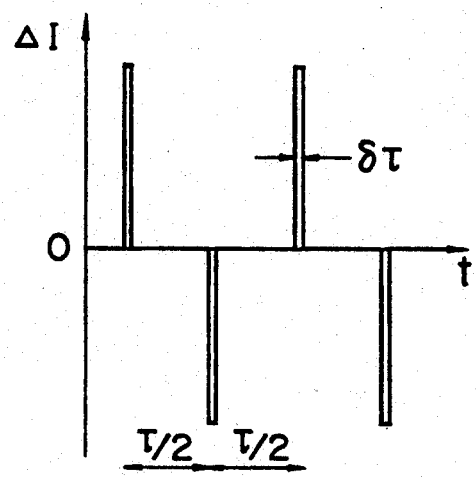
FIGS. 10A and 10B are graphs for explaining the sixth modulation method of the polarization switching light source.
Figure 10B:
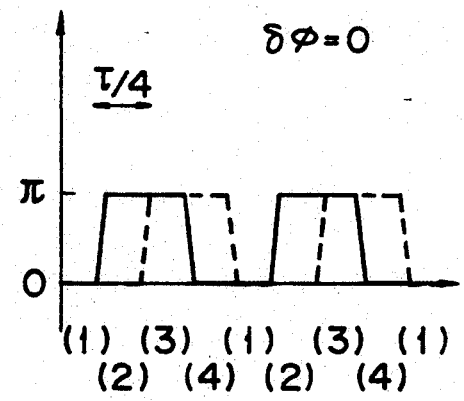

In the above-described cases, two independent polarization states are switched. However, three or more polarization states can be switched. FIGS. 9A and 9B show a case wherein three or more polarization states are switched. In this case, phase modulation of $\frac{2}{3}\pi$ is performed with one pulse. In addition, the propagation delay between the two optical paths is not limited to $\tau/2$. FIGS. 10A and 10B show a case wherein the propagation delay is set to be $\pi/4$. FIGS. 9A and 10A respectively show laser modulation current waveforms. FIGS. 9B and 10B respectively show phases $\theta_A(t)$ and $\theta_B(t)$ of light electric fields synthesized by the polarization beam splitter 48. In addition to these modifications, various modifications of the modulation method can be made.

Second Embodiment: Optical Receiver

An embodiment of an optical receiver according to the second aspect of the present invention will be described below.

Figure 11:
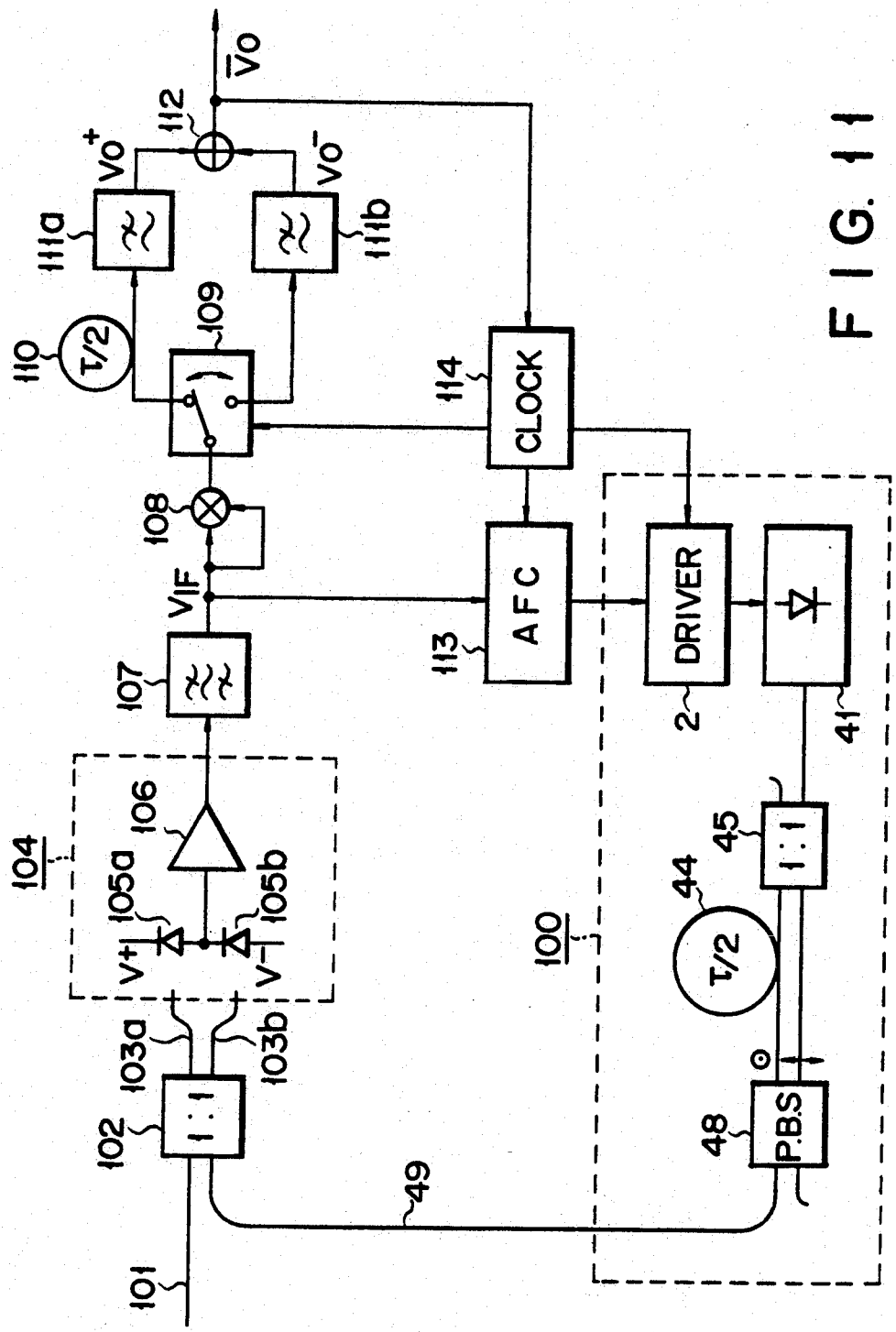
FIG. 11 is a block diagram showing a schematic arrangement of a heterodyne optical receiver according to an embodiment of another aspect of the present invention.

FIG. 11 shows the arrangement of a heterodyne optical receiver of a 100 Mb/s FSK single filter detection scheme. A polarization switching light source 100 as a local oscillation source has an arrangement substantially the same as that shown in FIG. 4. Output light from the local oscillation source 100 is input to a 1:1 optical coupler 102 through an optical fiber 49. Reception signal light is input to the 1:1 optical coupler 102 through an optical fiber 101. The output light from the local oscillation source 100 and the signal light are mixed with each other at a ratio of 1 to 1 and are heterodyne-received by a balanced optical receiver 104 through optical fibers 103a and 103b. At this time, the optical coupler 102 serves as a 180° hybrid circuit. The balanced optical receiver 104 comprises a light receiving portion constituted by a series circuit of two photodiodes 105a and 105b, and an intermediate frequency (IF) band front-end amplifier 106 for receiving an output from a node between outputs from the photodiodes 105a and 105b. The photodiodes 105a and 105b have substantially the same characteristics in terms of, e.g., quantum efficiency, response speed, and dark current, and are respectively coupled to the optical fibers 103a and 103b with substantially the same coupling efficiency $\eta = \eta a = \eta b$. The following components are connected to the output of the IF amplifier 106: a bandpass filter 107, a mixer 108, a signal branch circuit 109, a $\tau/2$-delay circuit 110, a low-pass filter 111, and an analog adder 112. Part of the output of the bandpass filter 107 is coupled to an IF automatic frequency control (AFC) circuit 113. The AFC circuit 113 maintains an IF frequency constant by controlling a current to a semiconductor laser 41 in the local oscillation source 100 through a laser driver 2.

An operation of the light receiver of this embodiment will be described next. Polarization states are switched for every 5-ns sub-time slot obtained by dividing a one-bit time slot T=10 ns into two portions. Polarization switching is realized by the modulation method shown in FIGS. 3A to 3L. For the sake of descriptive convenience, assume that no polarization rotation occurs in the optical fiber 49, and that a polarization coordinate system OXY of the optical coupler 102 corresponds to that of the polarization switching light source in FIGS. 3A to 3L. In this case, an x component $E_{Lx}$ and a y component $E_{Ly}$ of an electric field strength $E_L$ of the local oscillation light are respectively given by $$E_{Lx} = (|E_L|/\sqrt{2})\cos(\omega_L t + \theta(t))$$

-continued $$E_{Ly} = (|E_L|/\sqrt{2})\cos(\omega_L t + \theta(t - \tau/2) + \delta\theta_L)$$

for $$\theta(t - \tau/2) = \theta(t) + \pi f(t)$$
$$f(t) = 1 \quad (0 \leq t - N\tau < \tau/2)$$
$$\quad\quad 0 \quad (\tau/2 \leq t - N\tau < \tau)$$

where N is an integer. In this embodiment, $\tau = 10$ ns. Note that the switching time is neglected here for the sake of descriptive convenience. The effects of the switching time will be considered later.

An x component $E_{Sx}$ and a y component $E_{Sy}$ of the photoelectric field strength ES of the signal light input from the optical fiber 101 to the optical coupler 102 are respectively given by $$E_{Sx} = |E_S|\cos\xi \cdot \cos(\omega_S(t)t)$$

$$E_{Sy} = |E_S|\sin\xi \cdot \cos(\omega_S(t)t + \delta\theta_S)$$

where $0 \leq \xi \leq \pi/2$ represents the polarization state of the signal light. Assume that if a signal value S is "1", $\omega_S(t)$ becomes $\omega_{S1}$, and that if S="0", $\omega_S(t)$ becomes $\omega_{S2}$. In this case, $\delta\theta_L$ and $\delta\theta_S$ are phase differences between the x and y components of the local oscillation light and the signal light, respectively. Assume that $\omega_L$ is controlled by the AFC circuit 113 to have a predetermined frequency relationship with $\omega_{S1}$, i.e., $\omega_{IF1} = \omega_L - \omega_{S1}$. In this case, a frequency deviation $\omega_{S1} - \omega_{S2}$ is set to be 1 GHz; and an intermediate frequency $\omega_{IF1}$, 1 GHz.

The photodiode 105 does not respond to a light electric field of $\omega_S + \omega_L$. In addition, the x and y components of an electric field do not interfere with each other. Since the optical coupler 102 serves as a 180° hybrid circuit, the in-phase components of output currents from the photodiodes 105a and 105b are removed (balanced optical receiver). The bandpass filter 107 passes a component of $\omega_{IF} = \omega_{IF1}$ (1 GHz) but does not pass a component of $\omega_{IF} = \omega_{IF2}$ (2 GHz). Therefore, when S=1, an output $v_{IF}$ from the bandpass filter 107 is represented as follows:

$$v_{IF}^{\pm} = \sqrt{2}\,A|E_L||E_S|(\cos\xi \cdot \cos(\omega_{IF1}t + \theta(t)) \pm$$
$$\sin\xi \cdot \cos(\omega_{IF1}t + \theta(t) + \delta\theta))$$

where A is a constant, and $\delta\theta = \delta\theta_L - \delta\theta_S$. In this case, the sign "+" is given to the solution if f(t)=0(5ns<t--NT<10ns); and the sign "−", if f(t)=1(0ns<t--NT<5ns). The output $v_{IF}$ is then subjected to square-law detection in the mixer 108 and is branched by the signal branch circuit 109 on the basis of the value of f(t). When a signal branching operation based on f(t)=1 is to be performed, the circuit 109 is connected to the $\pi/2$ delay circuit 110. If each branch component is filtered by the low-pass filter 111, the following detection output can be obtained:

$$v_0^{\pm} = PA^2|E_L|^2|E_S|^2(1 \pm \sin(2\xi)\cos(\delta\theta)).$$

The cutoff frequencies of the low-pass filter is set to be 400 MHz, an intermediate value between 200 MHz ($1/T_S$) and 1 GHz ($\omega_{IF1}/2\pi$). The sign "+" represents a branching operation based on f(t)=1; and the sign "—", a branching operation based on f(t)=0. When both the outputs ar added by the analog adder 112, the resulting output is given by $$v_0 = PA^2|E_L|^2|E_S|^2$$

thus obtaining an output independent of the polarization state of the signal light. That is, polarization switching reception is achieved. In this case, the power penalty caused by detecting only a signal component having one polarization state in each sub-time frame is 3 dB. When the signal value S=0, since the bandpass filter output becomes 0, the output from the adder 112 becomes 0. According to the method of this embodiment, signal reception independent of polarization can be realized without using a polarization diversity module which requires cumbersome operations for adjustment and assembly and increases the cost. Although the electronic circuit is slightly complicated, the apparatus of the present invention can achieve a reduction in cost by forming it into an IC. Therefore, the cost of the apparatus can be greatly reduced as compared with the case wherein the polarization diversity module is used. In addition, since adjustment and assembly are facilitated, the apparatus of the present invention is suitable for mass production.

The influences of the switching time, which is previously neglected, will be considered now. As described with reference to the first embodiment, pulse-like frequency modulation accompanying polarization switching is caused in a beat output. Unless the modulation method is modified, polarization states in one time slot during a switching operation are not balanced. In this embodiment, therefore, the signal branch circuit 109 is designed not to pass a signal during a switching operation. Such an operation can be realized by, e.g., adjusting the duty of a gate pulse output from a clock control circuit 114. Although a penalty is caused in accordance with a reduction in reception energy due to a signal, a stable operation can be realized. In this embodiment, the time required for switching, including pulse jitter, is about 250 ps. The signal branch circuit 109 is designed to pass a signal only during $T_S' = 4.6$ ns corresponding to a sub-time slot $T_S = 5$ ns from which two end portions are removed. The penalty based on the fact that signal power corresponding to this portion cannot be used is 0.4 dB or less. Note that $\omega_L$ is controlled by the AFC circuit 113 to have a predetermined frequency relationship with $\omega_{S1}$, i.e., $\omega_{IF1} = \omega_L - \omega_{S1}$. The AFC circuit 113 is controlled by a gate signal output from the clock control circuit 114 to be operated only when the output signal is "1". Similarly, in this case, the duty of a gate pulse output from the clock control circuit 114 is adjusted to prevent a frequency variation in polarization switching from causing an unstable AFC operation.

In the above-described case, the time slot T is divided into two portions. However, the time slot T may be divided into three or more portions. If the time slot is divided into six or more portions, polarization switching can be regarded as polarization scrambling and the components from the signal branch circuit 109 to the adder 112 can be replaced with one low-pass filter. More specifically, by setting the time constant of the low-pass filter to be a value between the length of the sub-time slot $T_S$ and that of the time slot T, averaging, i.e., addition, of the respective sub-time slots can be performed.

In this embodiment, FSK is performed. However, the present invention can be applied to other modulation methods, such as DPSK and ASK, and other detection methods, such as delay detection.

Third Embodiment: Optical Receiver

An embodiment of an image removing light receiver according to the third and fourth aspects of the present invention will be described below.

Figure 12B:
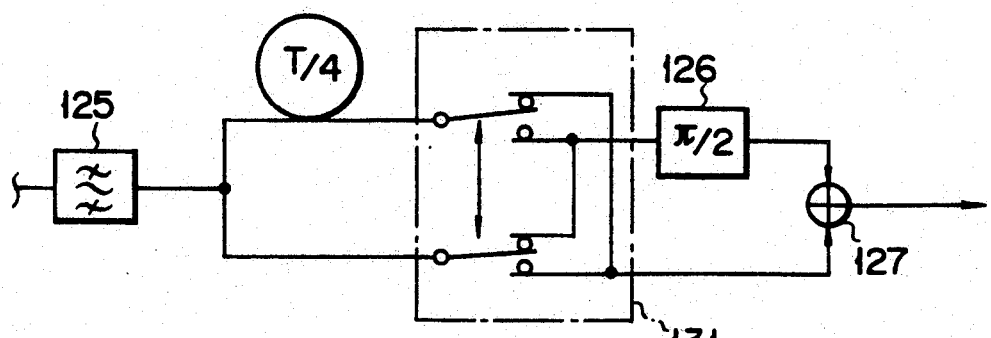
FIGS. 12A and 12B are block diagrams showing a schematic arrangement of a polarization diversity heterodyne optical receiver according to an embodiment of still another aspect of the present invention.
Figure 12A:
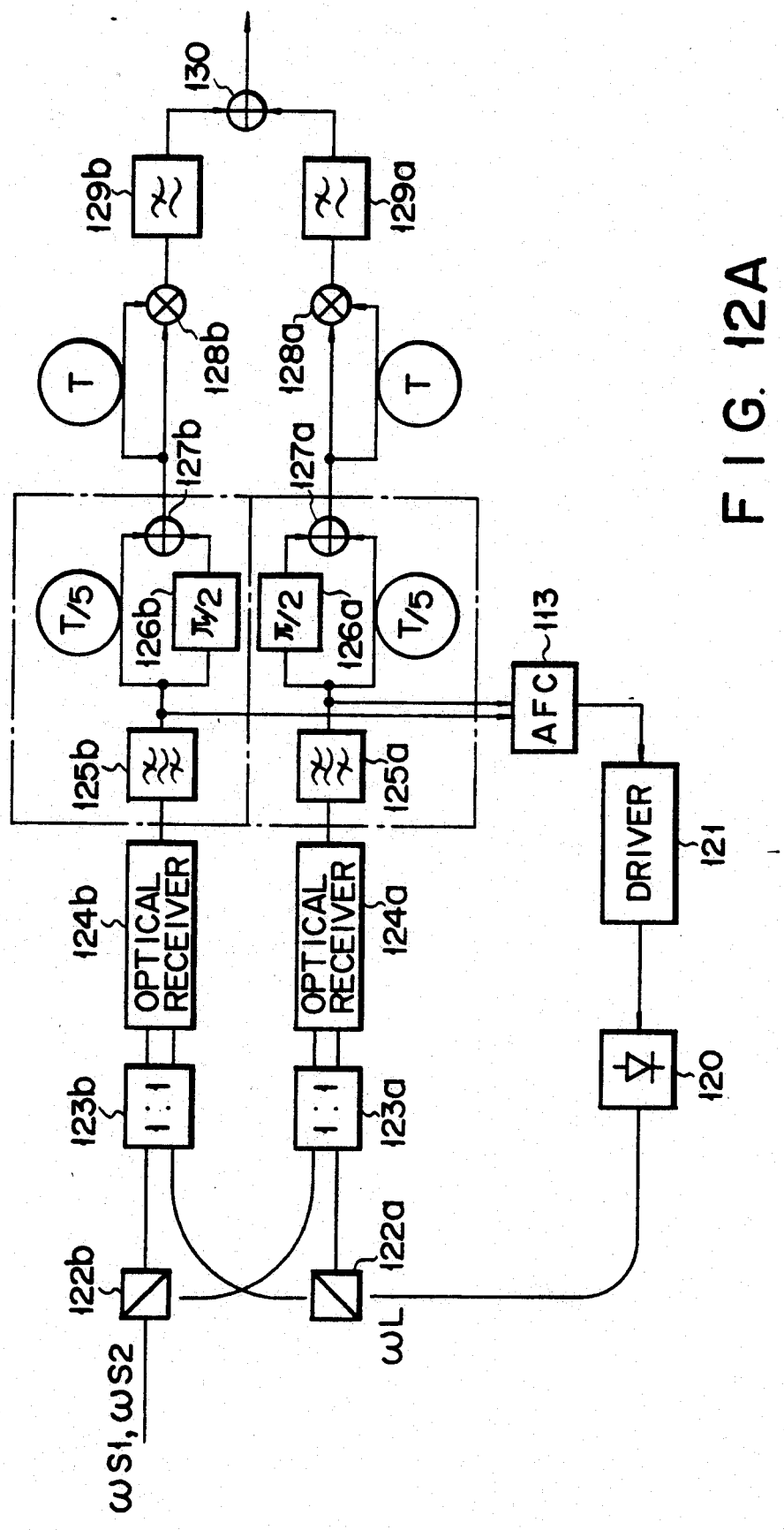

FIG. 12A shows the arrangement of a polarization diversity heterodyne optical receiver of a 200 Mb/s DPSK differential detection scheme of an embodiment according to the third aspect of the present invention. This optical receiver is designed to selectively receive signals, of light signals subjected to optical FDM at intervals of 2.5 GHz, which are transmitted through a fiber. The phase of output light from a semiconductor laser local oscillation source 120 changes by $\pi/2$ for every sub-time slot $T_S = 1$ ns, which is obtained by dividing a time slot $T = 5$ ns into five equal portions. However, no phase switching occurs in the boundary between adjacent time slots. This operation can be realized by performing pulse-like direct frequency modulation in the boundary between adjacent sub-time slots by using a laser driver 121 according to equation (2). The time required for phase switching is 0.1 ns. Local oscillation light is incident on a polarization beam splitter 122a at an angle of 45° with respect to its optical axis to be split into two components having the same power. Similarly, signal light is split into two polarized light components by a polarization beam splitter 122b. The signal light components and the local oscillation light components are respectively mixed by fiber couplers 123a and 123b while their polarization states are matched with each other. The mixed light components are respectively received by balanced optical receivers 124a and 124b. The arrangement of each light receiver is substantially the same as that of the optical receiver of the second embodiment. An output from each of bandpass filters 125a and 125b connected to the outputs of the respective optical receiving units is divided into two branch outputs. One branch output is delayed with respect to the other branch output by T/5, while the phase of the other branch output is delayed by 90° by a 90° phase shifter 126a or 126b. Subsequently, one branch output and the other branch output are added by an adder 127a or 127b. An output from each of the adders 127a and 127b is divided into two portions. After one branch output is delayed by T, the two outputs are multiplied with each other by a mixer 128a or 128b. The resulting value is then introduced into a low-pass filter 129a or 129b. Finally, the two polarized light components are added by an adder 130 to obtain a demodulated signal. In addition, part of the output of each bandpass filter 125a or 125b is coupled to an IF automatic frequency control (AFC) circuit 113. The AFC circuit 113 controls the oscillation frequency of the local oscillation light source 120 through the laser driver 121 so as to keep an IF frequency constant.

An operation of the light receiver of this embodiment will be described next. Signal light includes a plurality of channels. In this case, only a component having an angular frequency $\omega_{S1}$ to be received, and a component having an angular frequency $\omega_{S2}$ in a channel adjacent to the opposite side of local oscillation light having an angular frequency $\omega_L$ will be considered. Assume that the light frequencies are set to be $(\omega_{S1}-\omega_L)/(2\pi)=1$ GHz and $\omega_L-\omega_{S2}/(2\pi)=1.5$ GHz.

Other components need not be considered because beating occurs outside the band of each light receiving unit. An output from the local oscillation source 120 is phase-modulated by $\pi/2$ four times in the time slot T by the laser driver 121. The time slot is divided into five sub-time slots, each having a length $T_S=1$ ns. The polarization beam splitter 122a or 122b, the fiber coupler 123a or 123b, and the balanced optical receiving unit 124a or 124b receive beat signals produced by the respective polarized light components of the local oscillation light and the signal light in each sub-time slot. The phase of the received beat signal is shifted by $\pi/2$ for every sub-time slot. According to the expression used in the above description, beat outputs produced by branch components of polarized light a in the respective sub-time slots are given as follows:

$$I_{1a}(t) = A_1 S_i \xi_{1a} \cos((\omega_{S1} - \omega_L)t + \theta_{1a}) +$$
$$A_2 S_i \xi_{2a} \cos((\omega_L - \omega_{S2})t + \theta_{2a})$$

$$I_{2a}(t) = A_1 S_i \xi_{1a} \sin((\omega_{S1} - \omega_L)t + \theta_{1a}) -$$
$$A_2 S_i \xi_{2a} \sin((\omega_L - \omega_{S2})t + \theta_{2a})$$

$$I_{3a}(t) = -A_1 S_i \xi_{1a} \cos((\omega_{S1} - \omega_L)t + \theta_{1a}) -$$
$$A_2 S_i \xi_{2a} \cos((\omega_L - \omega_{S2})t + \theta_{2a})$$

$$I_{4a}(t) = -A_1 S_i \xi_{1a} \sin((\omega_{S1} - \omega_L)t + \theta_{1a}) +$$
$$A_2 S_i \xi_{2a} \sin((\omega_L - \omega_{S2})t + \theta_{2a})$$

$$I_{5a}(t) = I_{1a}(t)$$

where $S_i$ is the phase value of a time slot i, which is set to be 1 or $-1$ (a state wherein the phase is inverted by $\pi$), $A_1$, $A_2$, $\theta_{1a}$, and $\theta_{2a}$ are constants, and $\xi_{1a}$ and $\xi_{2a}$ ($0 \leq \xi_{1a}, \xi_{2a} \leq 1$) are the ratios of the polarized light a in signal light electric fields in channels 1 and 2. Branch components of polarized light b correspond to outputs obtained by replacing a with b in the above equations. However, $\xi_{1a}^2 + \xi_{1b}^2 = 1$ and $\xi_{2a}^2 + \xi_{2b}^2 = 1$.

This beat output is divided into two branch beat outputs. One branch beat output is then delayed with respect to the other branch beat output by T/5, while the phase of the other branch beat output is shifted by $\pi/2$ by the phase shifter 126a. The two outputs are added by the adder 127a. Adder outputs X1 are given by $$X_{1a}(t) = 2A_1 S_i \xi_{1a} \cos((\omega_{S1} - \omega_L)t + \theta_{1a})$$
$$X_{2a}(t) = 2A_1 S_i \xi_{1a} \sin((\omega_{S1} - \omega_L)t + \theta_{1a})$$
$$X_{3a}(t) = -2A_1 S_i \xi_{1a} \cos((\omega_{S1} - \omega_L)t + \theta_{1a})$$
$$X_{4a}(t) = -2A_1 S_i \xi_{1a} \sin((\omega_{S1} - \omega_L)t + \theta_{1a})$$

Thus, image components are removed. Since $X_{5a}$ is obtained by a calculation with the next time slot component, it is not used for signal detection. The corresponding power penalty is about 1 dB. Since the IF frequency is 1 GHz, one period of the IF signal corresponds to the length $T_S(=1$ ns) of the sub-time slot. In this case, if the output in each sub-time slot is differentially detected by the delay line of T, the mixer 128a, and the low-pass filter 129a, the resulting output is represented by $$X_{0ai}^2 = X_{1ai} \cdot X_{1a(i+1)} = X_{2ai} \cdot X_{2a(i+1)}$$
$$= X_{3ai} \cdot X_{3a(i+1)} = X_{4ai} \cdot X_{4a(i+1)}$$
$$= 2A_1^2 S_i S_{(i+1)} \xi_{1a}^2$$

Similarly, with regard to the branch component, of the polarized light b, which has a polarization state orthogonal to that of the branch component of the polarized light a, the following output can be obtained:

$$X_{0bi}^2 = 2A_1^2 S_i S_{(i+1)} \xi_{1b}^2$$

Therefore, if the two outputs are added by the adder 130, since $\xi_{1a}^2 + \xi_{1b}^2 = 1$, $$X_0^2 = 2A_1^2 S_i S_{(i+1)}$$

is obtained. If it is determined whether $S_i S_{(i+1)}$ is 1 or $-1$, a signal value can be identified. That is, polarization diversity image rejection signal reception is achieved.

According to the optical receiver of the third embodiment, the optical system can be greatly simplified as compared with the polarization diversity image rejection light receiver shown in FIG. 18. In comparison with the optical system which is high in cost and requires cumbersome operations for adjustment and assembly, an electronic circuit allows a great reduction in labor and cost. Therefore, a considerable reduction in cost can be achieved as a whole. In addition, the performance of the apparatus can be improved in terms of temperature characteristics and stability of operation. Signals corresponding to portions of the switching time and AFC can be treated in the same manner as in the second embodiment.

FIG. 12B shows a case wherein phase switching of the local oscillation source is alternately performed between $\pi/2$ and $-\pi/2$. Although the basic arrangement of the local oscillation source is similar to that shown in FIG. 12A, the portions enclosed within an alternate long and short dashed line in FIG. 12A is replaced with the portion shown FIG. 12B. Four sub-time slots are used, TS = 1.25 ns, and the IF frequency is 800 MHz. Signal switching circuits 131a and 131b are respectively arranged in front of the phase shifters 126a and 126b. Under the same conditions as in the above-described embodiment, the following outputs appear at the output of the optical receiving unit in each sub-time slot of the branch component of the polarised light a:

$$I_{1a}(t) = I_{3a}(t)$$
$$= A_1 S_i \xi_{1a} \cos((\omega_{S1} - \omega_L)t + \theta_{1a})$$
$$= A_2 S_i \xi_{2a} \cos((\omega_L - \omega_{S2})t + \theta_{2a})$$

$$I_{2a}(t) = I_{4a}(t)$$
$$= A_1 S_i \xi_{1a} \sin((\omega_{S1} - \omega_L)t + \theta_{1a})$$
$$= -A_2 S_i \xi_{2a} \sin((\omega_L - \omega_{S2})t + \theta_{2a})$$

This beat output is divided into two branch components. One branch component is delayed with respect to the other branch component by T/4. The branch component whose phase is shifted by $\pi/2$ by the phase shifter 126a is switched for every sub-time slot by the signal switching circuit 131a. When the two branch outputs are added by the adder 127a, the output $X_1$ is given by $$X_{1a}(t) = X_{2a}(t) = X_{3a}(t)$$
$$= 2A_1 S_i \xi_{1a} \cos((\omega_{S1} - \omega_L)t + \theta_{1a})$$

Thus, image components are removed. Since $X_{4ai}$ is obtained by a calculation with the next time slot component, it is not used for signal detection. Since the IF frequency is 800 MHz, one period of the IF signal corresponds to the length $T_S$ (=1.25 ns) of the sub-time slot. Subsequent operations are the same as those in the embodiment shown in FIG. 12A, and $$X_{0i}^2 = 2A_1^2 S_i S_{(i+1)}$$

is obtained as an output from the adder 130. In addition, the same effect as in the light receiver shown in FIG. 12A is obtained.

Fourth Embodiment: Coherent Optical Transmission System

An embodiment of a coherent optical transmission system for simultaneously performing phase switching and polarization switching according to the fifth aspect of the present invention will be described in detail below with reference to FIGS. 13A and 13B.

FIG. 13A shows the schematic arrangement of an optical FDM high-definition CATV distribution system according to this embodiment. In a wavelength band of 1.55 μm, 200-Mb/s DPSK signals are transmitted in 64 channels at channel intervals of 6 GHz. The wavelength band used in this system is about 30 Å. Each light transmitter 140 includes a semiconductor laser module 141, a driver 142, and a stabilizing circuit 143. The driver 142 includes a bias circuit 144, a DPSK coder 145, a phase switching circuit 146, and the like. Light signals of the respective channels are mixed with each other by a star coupler 147 and are distributed to tens of thousands of subscriber's optical receivers 150 through 1:8 light distributors 148 and optical amplifiers 149 for compensating for losses accompanying the distribution. Synchronization of modulation timings, the channel interval, and the absolute frequency are controlled by a common control system 151.

FIG. 13B shows the arrangement of each subscriber's optical receiver. The arrangements of a polarization switching local oscillation source 152, a photo-coupler 153, and a balanced optical receiving unit 154 are the same as those in the optical receiver of the second embodiment. An output from the balanced optical receiving unit 154 is differentially detected by a differential detector 155. The detection output is converted into a digital value by an A/D converter 156 and is input to four sample/hold circuits 157 having different sampling timings. Outputs from these circuits 157 are then added by a sample/hold circuit 158 arranged after the circuits 157. The addition result is output to an identifying circuit 159. In addition to these components, the optical receiver 150 includes a clock circuit 160 for controlling the timings of the sample/hold circuits and an AFC circuit 161 for stabilizing the oscillation frequency of a local oscillation source.

An operation of this coherent optical transmission system will be described next.

The optical transmitter 140 performs 0- or π-phase pulse modulation of a semiconductor laser through the DPSK coder 145. In addition, π/2-phase fixed phase modulation is also performed every 2.5 ns corresponding to ¼ a time slot T=5 ns by means of the phase switching circuit 146. With this operation, the time slot is divided into two phase time slots $T_1$ and $T_2$. This phase modulation is performed by decreasing the optical frequency in the form of a pulse. The timings of this modulation are controlled by a common control system 151 so as to coincide with each other in all the channels when light signals are mixed by the star coupler 147. Therefore, in the subscriber's optical receivers 150, frequency variations accompanying phase modulation simultaneously occur in the respective channels. If a signal value in a given time slot j of a channel i is represented by $A_{ij}$ (1 or −1), the electric field strengths of light outputs in the time slots $T_1$ and $T_2$ are respectively represented by $A_{ij}|E_{Si}/\sqrt{2}|\cos(\omega_{Si}t + \theta_{Si})$ and $A_{ij}|E_{Si}/\sqrt{2}|\sin(\omega_{Si}t + \theta_{Si})$. Since the DPSK modulation signal is subjected to π/2 phase switching twice, if no modulation signal is supplied from the DPSK coder 145, $A_{ij}$ and $A_{i(j+1)}$ are reversed, and vice versa.

Output light from the local oscillation source 152 of the light receiver 150 alternately exhibits orthogonal polarization states upon polarization switching. These polarization states respectively define polarization sub-time slots $T_A$ and $T_B$. The polarization sub-time slots are set to be switched at an intermediate position in a phase sub-time slot. In addition, phase modulation for polarization switching is realized by decreasing the optical frequency of the local oscillation source 152 in the form of a pulse by using the modulation method shown in FIGS. 5a to 5C. Therefore, when the output light exhibits the same polarization state again, the phase is inverted. In a polarization sub-time slot A, output light exhibiting a polarization state A with an electric field strength $|E_L/\sqrt{2}|\cos(\omega_L t + \theta_{LA})$ appears. In a polarization sub-time slot B, output light exhibiting a polarization state B with an electric field strength $|E_L/\sqrt{2}|\cos(\omega_L t + \theta_{LB})$ appears. Assume, in this case, that the local oscillation source is set to satisfy $\omega_L = \omega_{Si}$ in order to select the channel i from the channels of signal light.

This local oscillation light is mixed with the signal light by the optical coupler 153, and the resulting light is received by the balanced optical receiver 154. If the components of the signal light power in the channel i, which have the polarization states A and B are respectively represented by $\xi_{iA}^2$ and $\xi_{iA}^2$, $\xi_{iA}^2 + \xi_{iB}^2 = 1$, $0 \leq \xi_{iA} \leq 1$, and $0 \leq \xi_{iB} \leq 1$. At this time, in polarization/phase sub-time slots corresponding to phase sub-time slots 1 and 2 and the polarization sub-time slots A and B, the following beat output components appear:

$$S_{ij1A} = PA_{ij}\xi_{iA}|E_{Si}E_L/2|\cos(\delta\theta_{iA})$$
$$S_{ij1B} = PA_{ij}\xi_{iB}|E_{Si}E_L/2|\cos(\delta\theta_{iB})$$
$$S_{ij2B} = \pm PA_{ij}\xi_{iB}|E_{Si}E_L/2|\sin(\delta\theta_{iB})$$
$$S_{ij2A} = \pm PA_{ij}\xi_{iA}|E_{Si}E_L/2|\sin(\delta\theta_{iA})$$

where P is a constant representing a loss and a conversion efficiency, and $\delta\theta_{iA}$ and $\delta\theta_{iB}$ are the phase differences between signal light and local oscillation light of the respective polarization components. When these outputs are multiplied by a component in a time slot (j+1) and differentially detected by the differential detector 15, the following values are obtained:

$$X_{ij1A} = -P^2 A_{ij} A_{i(j+1)} \xi_{iA}^2 |E_S E_L/2|^2 \cos^2(\delta\theta_{iA})$$
$$X_{ij1B} = -P^2 A_{ij} A_{i(j+1)} \xi_{iB}^2 |E_S E_L/2|^2 \cos^2(\delta\theta_{iB})$$
$$X_{ij2B} = -P^2 A_{ij} A_{i(j+1)} \xi_{iB}^2 |E_S E_L/2|^2 \sin^2(\delta\theta_{iB})$$

-continued
$$X_{ij2A} = -P^2 A_{ij} A_{i(j+1)} \xi_{iA}^2 |E_S E_L/2|^2 \sin^2(\delta\theta_{iA})$$

The sign "—" is produced when the phase is inverted by 180× when the polarization switching shown in FIGS. 5A to 5C is performed. These outputs are converted into positive/negative octonary values by the A/D converter 156. The input level of the A/D converter 156 can be kept constant by controlling the gain of the amplifier of the balanced light receiving unit 154. Since these outputs appear time-serially in the order named, they are held by the sample/hold circuits 157 having different sampling timings until the last output $X_{ij2A}$ appears. When the last output $X_{ij2A}$ appears, all the outputs are input to the sample/hold circuit 158 to be added. As a result, the following value is obtained by the identifying circuit 159:

$$\begin{aligned} Y_{ij} &= X_{ij1A} + X_{ij1B} + X_{ij2B} + X_{ij2A} \\ &= -P^2 A_{ij} A_{i(j+1)} |E_S E_L/2|^2 \end{aligned}$$

Therefore, signal reception can be performed independently of the phase difference between signal light and local oscillation light and the polarization state of signal light in the optical receiver. The circuits subsequent to the A/D converter 156 are operated by a clock of 800 MHz. This operation can be realized by an Si bipolar IC. Although a quantization error appears with respect to each sub-time slot in the A/D converter 156, since it is only required in the last identifying step to determine whether $A_{ij}A_{i(j+1)}$ is 1 or −1, a quantization level of about an octonary value is enough. In practice, the polarization state of a light source varies depending on the state of an optical fiber. However, such variation is slow as compared with the time slot T and hence poses no problems. Although the phase also varies with time due to phase noise, a large penalty can be prevented as long as phase variation in the time slot T is sufficiently small. In addition, if the intermediate frequency is sufficiently small as compared with the frequency (800 MHz) of the sub-time slot, it need not be completely zero. In the above-described case, A/D conversion is performed before the respective time slot outputs are added. However, these outputs may be added as analog signals.

The clock circuit 160 performs clock extraction on the basis of the frequency variation of an output signal from the balanced optical receiver 154. That is, since a high-frequency beat component accompanying a frequency variation appears upon switching of sub-time slots, clock extraction can be performed on the basis of the timing that the beat component appears. Since a frequency variation changes depending on the value of a DPSK signal upon switching of time slots, the frequency variations of local oscillation light and signal light can be identified. Furthermore, by detecting the interval between the frequency variation of signal light and that of local oscillation light, the timing of polarization switching can be controlled.

Similar to the second embodiment, an error accompanying a switching operation can be prevented by performing timing control to inhibit an operation of the A/D converter 156 at the instant when a beat frequency variation accompanying the phase variation of signal light or local oscillation light appears. Similarly, the frequency variation of the local oscillation source can be suppressed by inhibiting the use of a beat signal in a switching state for AFC of the local oscillation source. Since the timings of phase switching are the same in all the channels, no error is caused in a given channel due to the influences of a frequency variation in another channel.

According to the coherent transmission system of this embodiment, with one optical receiving unit, the same function as that of a polarization/phase-diversity light receiver using four optical receiving units can be achieved. Although the operation speed of the optical receiver is increased, since a high intermediate frequency need not be used because of phase switching, no significant problems are posed. The system requires a complicated electronic circuit. However, an increase in cost can be suppressed by the use of ICs. Therefore, the complicated optical system can be simplified, and the number of optical receiving units can be reduced. Such merits are much worthier than the above-mentioned demerits. In multi-port reception, the characteristics of the respective optical receiving units must be matched with each other. In this embodiment, however, since one optical receiving unit is used time-divisionally, no such consideration need be given. Therefore, a subscriber's terminal with a small number of portions to be adjusted can be realized at a low cost, and a large CATV distribution system can be formed.

The present invention is not limited to this embodiment but can be applied to, e.g., an optical subscriber's system, a trunk transmission system, an optical LAN, a MAN, and an optical switching system.

Fifth Embodiment: Coherent Optical Transmission System

An embodiment of a coherent optical transmission system for simultaneously performing image rejection and polarization switching operations according to the sixth and seventh aspects of the present invention will be described in detail below with reference to FIG. 14.

An optical FDM high-definition CATV distribution system according to an embodiment of the present invention has substantially the same arrangement as that of the system shown in FIG. 13A. In this system, 150-Mb/s DPSK signals are transmitted in 64 channels at channel intervals of 4.5 GHz in a wavelength band of 1.55 μm. The arrangement of each light transmitter 140 is the same as that in the fourth embodiment except that five phase sub-time slots are present, and the phase changes by π/2. Although frequency modulation for DPSK is performed upon switching of time slots, no phase switching is performed.

Figure 14:
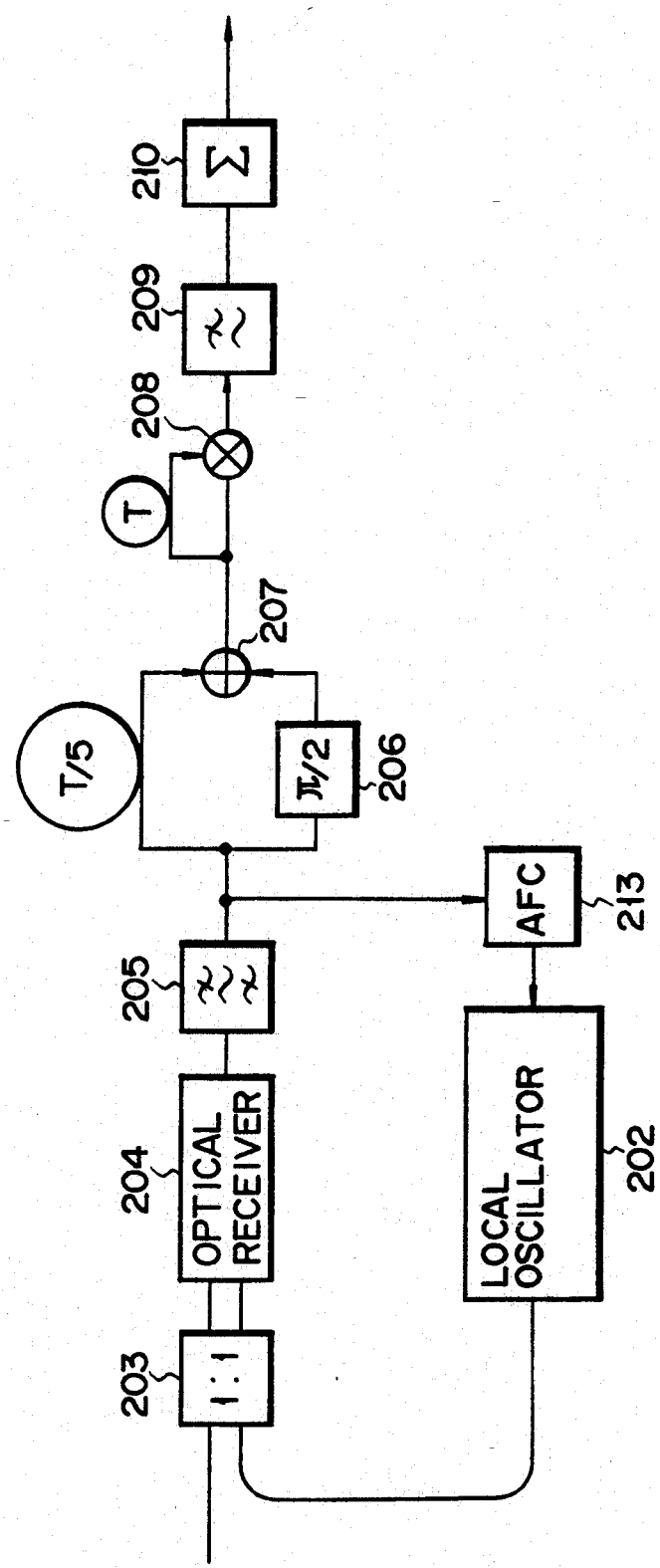
FIG. 14 is a block diagram showing a schematic arrangement of a coherent optical transmission system according to another embodiment of still another aspect of the present invention.

FIG. 14 shows the arrangement of a subscriber's optical receiver 201. The arrangements of a polarization switching local oscillation source 202, an optical coupler 203, a balanced optical receiving unit 204, and the like are the same as those in the light receiver of the fourth embodiment. Polarization switching is performed at a frequency twice that used in the fourth embodiment in synchronism with each phase sub-time slot of signal light by the method described with reference to FIGS. 3A to 3F. Therefore, a total of 10 phase/-polarization sub-time slots are formed. Although signal light includes a plurality of channels, only a component having an angular frequency $\omega_{S1}$ to be received, and a component having an angular frequency $\omega_{S2}$ in a channel adjacent to the opposite side of local oscillation light having an angular frequency $\omega_L$ will be considered hereinafter. Assume that the light frequencies are set to be $(\omega_{S1}-\omega_L)/(2\pi)=1.5$ GHz and $\omega_L-\omega_{S2}/(2\pi)=3$ GHz. Other components need not be considered because beating occurs outside the band of the optical receiving unit. The IF frequency of a signal is synchronized with the switching frequency (1.5 GHz) for the sub-time slots. Beat signals resulting from the respective polarization components of local oscillation light and signal light are received in units of sub-time slots. The beat outputs in the respective sub-time slots are $$I_{1a}(t) = A_1A\xi_{1a}\cos((\omega_{S1}-\omega_L)t + \theta_{1a}) +$$
$$A_2S_i\xi_{2a}\cos((\omega_L-\omega_{S2})t + \theta_{2a})$$

$$I_{1b}(t) = A_1S_i\xi_{1b}\cos((\omega_{S1}-\omega_L)t + \theta_{1b}) +$$
$$A_2S_i\xi_{2b}\cos((\omega_L+\omega_{S2})t + \theta_{2b})$$

$$I_{2a}(t) = A_1S_i\xi_{1a}\sin((\omega_{S1}-\omega_L)t + \theta_{1a}) -$$
$$A_2S_i\xi_{2a}\sin((\omega_L-\omega_{S2})t + \theta_{2a})$$

$$I_{2b}(t) = A_1S_i\xi_{1b}\sin((\omega_{S1}-\omega_L)t + \theta_{1b}) -$$
$$A_2S_i\xi_{2b}\sin((\omega_L-\omega_{S2})t + \theta_{2b})$$

$$I_{3a}(t) = -A_1S_i\xi_{1a}\cos((\omega_{S1}-\omega_L)t + \theta_{1a}) -$$
$$A_2S_i\xi_{2a}\cos((\omega_L-\omega_{S2})t + \theta_{2a})$$

$$I_{3b}(t) = -A_1S_i\xi_{1b}\cos((\omega_{S1}-\omega_L)t + \theta_{1b}) -$$
$$A_2S_i\xi_{2b}\cos((\omega_L-\omega_{S2})t + \theta_{2b})$$

$$I_{4a}(t) = -A_1S_i\xi_{1a}\sin((\omega_{S1}-\omega_L)t + \theta_{1a}) +$$
$$A_2S_i\xi_{2a}\sin((\omega_L-\omega_{S2})t + \theta_{2a})$$

$$I_{4b}(t) = -A_1S_i\xi_{1b}\sin((\omega_{S1}-\omega_L)t + \theta_{1b}) +$$
$$A_2S_i\xi_{2b}\sin((\omega_L-\omega_{S2})t + \theta_{2b})$$

$$I_{5a}(t) = I_{1a}(t)$$
$$I_{5b}(t) = I_{1b}(t)$$

An output from a bandpass filter 205 arranged after the light receiving unit 204 is divided into two branch components. One branch component is delayed with respect to the other branch component by T/5, while the phase of the other branch component is delayed by 90° by a phase shifter 206. The two branch outputs are then added by an adder 207. As a result, similar to the third embodiment, the following values are obtained:

$$X_{1a}(t) = 2A_1S_i\xi_{1a}\cos((\omega_{S1}-\omega_L)t + \theta_{1a})$$
$$X_{1b}(t) = 2A_1S_i\xi_{1b}\cos((\omega_{S1}-\omega_L)t + \theta_{1b})$$
$$X_{2a}(t) = 2A_1S_i\xi_{1a}\sin((\omega_{S1}-\omega_L)t + \theta_{1a})$$
$$X_{2b}(t) = 2A_1S_i\xi_{1b}\sin((\omega_{S1}-\omega_L)t + \theta_{1b})$$
$$X_{3a}(t) = -2A_1S_i\xi_{1a}\cos((\omega_{S1}-\omega_L)t + \theta_{1a})$$
$$X_{3b}(t) = -2A_1S_i\xi_{1b}\cos((\omega_{S1}-\omega_L)t + \theta_{1b})$$
$$X_{4a}(t) = -2A_1S_i\xi_{1a}\sin((\omega_{S1}-\omega_L)t + \theta_{1a})$$
$$X_{4b}(t) = -2A_1S_i\xi_{1b}\sin((\omega_{S1}-\omega_L)t + \theta_{1b})$$

Thus, image components are removed. Since $X_{5a}$ and $X_{5b}$ as sub-time slot outputs are obtained by calculations with the next time slot component, they are not used for signal detection. The corresponding power penalty is about 1 dB. Since the IF frequency is 1.5 GHz, one period of the IF signal corresponds to the length $T_S$ of the sub-time slot. In this case, if the output in each sub-time slot is differentially detected by a delay line of T, a mixer 208, and a low-pass filter 209, the resulting outputs are represented by $$X_{0ai}^2 = X_{1ai} \cdot X_{1a(i+1)} = X_{2ai} \cdot X_{2a(i+1)}$$
$$= X_{3ai} \cdot X_{3a(i+1)} = X_{4ai} \cdot X_{4a(i+1)}$$
$$= 2A_1^2 S_i S_{i+1} \xi_{1a}^2$$

$$X_{0bi}^2 = X_{1bi} \cdot X_{1b(i+1)} = X_{2bi} \cdot X_{2b(i+1)}$$
$$= X_{3bi} \cdot X_{3b(i+1)} = X_{4bi} \cdot X_{4b(i+1)}$$
$$= 2A_1^2 S_i S_{i+1} \xi_{1b}^2$$

Since orthogonal polarization states a and b alternately appear, if the two outputs are added by an adder 210, since $\xi_{1a}^2+\xi_{1b}^2=1$, the following value is obtained:-

$$X_0^2 = 2A_1^2 S_i S_{(i+1)}$$

If an identifying unit 211 is used to determine whether $S_iS_{(i+1)}$ is 1 or $-1$, a signal value can be identified. That is, polarization switching/image rejection reception can be performed. Note that the same function as that of addition can be realized by averaging without using the adder 210 by increasing the time constant of the low-pass filter 209.

Part of the output of the bandpass filter 205 is coupled to an IF automatic frequency control (AFC) circuit 213. The AFC circuit 213 controls the oscillation frequency of a local oscillation light source 202 through a laser driver so as to keep the IF frequency constant.

According to this embodiment, image removing signal reception can be realized independently of polarization with a simple optical system, thus realizing an optical FDM with a reduced channel interval.

Phase switching may be alternately performed between $\pi/2$ and $-\pi/2$. Although the basic arrangement is similar to that shown in FIG. 13A, this embodiment employs four phase sub-time slots and eight polarization time slots and eight polarization/phase sub-time slots. In addition, the IF frequency is set to be $(\omega_{S1}-\omega_L)/2=1.2$ GHz and $(\omega_L-\omega_{S2})/(2\pi)=2.4$ GHz, and the frequency interval is 3.6 GHz. A signal switching circuit 214 is arranged before the phase shifter 206. Under the same conditions as those in the above-described embodiment, the following outputs appear at the output of the light receiver in the respective sub-time slots:

$$I_{1a}(t) = I_{3a}(t)$$
$$= A_1S_i\xi_1 a\cos((\omega_{S1}-\omega_L)t + \theta_{1a})$$
$$= +A_2S_i\xi_{2a}\cos((\omega_L-\omega_{S2})t + \theta_{2a})$$

$$I_{1b}(t) = I_{3b}(t)$$
$$= A_1S_i\xi_{1b}\cos((\omega_{S1}-\omega_L)t + \theta_{1b})$$
$$= +A_2S_i\xi_{2b}\cos((\omega_L-\omega_{S2})t + \theta_{2b})$$

$$I_{2a}(t) = I_{4a}(t)$$
$$= A_1S_i\xi_{1a}\sin((\omega_{S1}-\omega_L)t + \theta_{1a})$$
$$= -A_2S_i\xi_{2a}\sin((\omega_L-\omega_{S2})t + \theta_{2a})$$

$$I_{2b}(t) = I_{4b}(t)$$
$$= A_1S_i\xi_{1b}\sin((\omega_{S1}-\omega_L)t + \theta_{1b})$$
$$= -A_2S_i\xi_{2b}\sin((\omega_L-\omega_{S2})t + \theta_{2b})$$

This beat output is divided into two branch components. One branch component is delayed with respect to the other branch component by T/4. The branch component whose phase is shifted by $\pi/2$ by the phase shifter 206 is switched for every sub-time slot by the signal switching circuit 214. When the two branch outputs are added by the adder 207, outputs X are given by $$X_{1ai}(t) = X_{2ai}(t) = X_{3ai}(t)$$
$$= 2A_1 S_i \xi_{1a} \cos((\omega_{S1} - \omega_L)t + \theta_{1a})$$

$$X_{1bi}(t) = X_{2bi}(t) = X_{3bi}(t)$$
$$= 2A_1 S_i \xi_{1a} \cos((\omega_{S1} - \omega_L)t + \theta_{1b})$$

Thus, image components are removed. Since $X_{4ai}$ and $X_{4bi}$ are obtained by calculations with the next time slot component, they are not used for signal detection. Since the IF frequency is 1.2 GHz, one period of the IF signal corresponds to the length $T_S$ of the sub-time slot. Subsequent operations are the same as those in the embodiment described above, and $$X_{0i}^2 = 2A_1^2 S_i S_{(i+1)}$$

is obtained as an output from the adder 210.

In addition to this embodiment, the phase switching method, the modulation method for polarization switching, and the combination thereof can be variously modified and applied.

As has been described in detail above, according to the present invention, since the polarization switching light source according to the first aspect of the present invention employs direction modulation of a semiconductor laser as a light source, the insertion loss and the number of portions to be adjusted can be reduced as compared with the case wherein an external modulator is used. Therefore, mass production, a cost reduction, and reductions in size and weight of the system can be achieved. In general, an external modulator, either a phase modulator or a polarization modulator, based on the electrooptic effect requires a high driving voltage, leading to difficulty in high-speed switching. In contrast to this, since a semiconductor laser easily allows a high-speed operation and has a frequency modulation efficiency on the order of 1 GHz/mA, phase modulation of $\pi/2$ or $\pi$ can be performed with a current pulse of several mA and about 100 ps. Therefore, high-speed switching can be easily achieved. In addition, the reliability of switching is high because an external modulator having poor temperature characteristics and low reliability is not used, and a semiconductor laser for a light source is generally stabilized against temperature changes and has high reliability.

In polarization switching based on the modulation method of the present invention, the oscillation frequency and output of the laser are kept constant except for a region corresponding to a short period of time during which a pulse current is supplied. Therefore, changes in the oscillation frequency and output of the laser before and after switching, which pose the problems in the conventional polarization switching, do not occur. Therefore, the application range of the system is wide.

The arrangement of the optical receiver according to the second aspect of the present invention is simpler than that of the conventional polarization diversity optical receiver, thereby allowing a reduction in the number of portions to be assembled and adjusted, and realizing mass production and reductions in cost, size, and weight. In addition, the reliability can be improved. In the conventional multi-port reception, the characteristics of the respective ports must be matched with each other. In the method of the present invention, however, since one receiver is used time-divisionally, no characteristic variation basically occur in reception of different polarization states. Furthermore, in the conventional polarization switching (polarization scrambling), since no external modulator is used, the light receiver of the present invention realizes high-speed switching, a low loss, high stability, a low cost, and reductions in size and weight. Therefore, the optical receive is advantageous in terms of reliability and mass production. Moreover, since no frequency variation of local oscillation light occur before and after polarization switching, the AFC circuit is free from complication. In performing FSK, the IF band and the modulation factor need not be increased exceedingly.

The arrangement of the optical receiver according to the third and fourth aspects of the present invention is simpler than that of the conventional image rejection optical receiver. Therefore, the number of portions to be assembled and adjusted can be reduced, and mass production and reductions in cost, size, and weight can be realized in addition to a improvement in reliability. Furthermore, in the conventional multi-port reception, the characteristics of the respective ports must be matched with each other. In the method of the present invention, however, since one receiver is used time-divisionally, no characteristic variation basically occur in reception of different branch light components.

The coherent optical transmission system according to the fifth aspect of the present invention has a simple arrangement as compared with the coherent optical transmission system using the conventional polarization/phase diversity optical receiver. The coherent optical transmission systems according to the sixth and seventh aspects of the present invention have simple arrangements as compared with the conventional coherent optical transmission system using the image rejection optical receiver. In either of the aspects described above, the number of portions to be assembled and adjusted can be reduced, and mass production and reductions in cost, size, and weight can be realized. In addition, in the conventional multi-port reception, the characteristics of the respective ports must be matched with each other. In the method of the present invention, however, since one receiver is used time-divisionally, no characteristic variation basically occur in reception of different polarization states and different phase states.

According to the present invention, therefore, (1) a polarization switching light source having a simple arrangement and a small number of limitations can be realized, (2) image rejection signal reception based on new concepts, which prevents complication of an optical system, can be realized, and (3) coherent optical reception with a simple optical system, which is independent from polarization and resistant to phase noise, can be achieved. Therefore, the present invention can solve the problems of polarization matching, phase noise, receiver band width, and high-density optical FDM, which interfere with the practical applications and spread of coherent optical communication, at low cost.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical circuit which includes a polarization switching light source, said optical circuit comprising:
   a semiconductor laser for outputting laser output light;
   phase modulation means for supplying a pulse current to said semiconductor laser to subject a phase modulation of a predetermined cyclic pattern to said semiconductor laser;
   branch means for dividing the output light from said semiconductor laser into first and second branch output light components having substantially the same power;
   delay means for delaying the first branch output light component with respect to the second branch output light component, by a predetermined amount; and
   means for mixing the first branch output light component delayed by said delay means with the second branch output light component while polarization states thereof are caused to be orthogonal,
   wherein a delay time of the first branch output light component with respect to the second branch output light component is set to be a fraction of an integer of a period of the phase modulation.

2. An optical receiver comprising:
   a local oscillator, including a semiconductor laser for outputting laser output light, for generating a local oscillation output light having at least two polarization states corresponding respectively to at least two first time slots obtained by dividing a second time slot corresponding to a one-bit signal;
   optical receiving means for receiving, as a reception signal, a beat component resulting from interference between signal light from a transmission light source and the local oscillation output light of said local oscillator which corresponds to each of the first time slots;
   detection means for detecting said reception signal in each of a plurality of first time slots, and outputting at least two detection outputs corresponding to said first time slots; and
   means for adding the detection outputs in the first time slots within the second time slot;
   phase modulation means for supplying a pulse current to said semiconductor laser to subject a phase modulation of a predetermined cyclic pattern to said semiconductor laser;
   branch means for dividing the output light from said semiconductor laser into first and second branch output light components having substantially the same power;
   delay means for delaying the first branch output light component with respect to the second output light component, by a predetermined amount; and
   means for mixing the first branch output light component delayed by said delay means with the second branch output light component while the polarization states thereof are caused to be orthogonal,
   wherein a delay time of the first branch output light component with respect to the second branch output light component is set to be a fraction of an integer of a period of the phase modulation.

3. The optical receiver according to claim 2, wherein said optical receiving means includes means for inhibiting signal detection at the instant when a frequency variation accompanying a phase variation of said local oscillation light appears in an electrical beat signal.

4. The optical receiver according to claim 2, which includes AFC means for detecting a difference between a beat frequency and a preset value thereof and controlling a oscillation frequency of said polarization switching light source to set the beat frequency to be a predetermined value only when a frequency variation accompanying a phase variation of the local oscillation light does not appear in a beat signal.

5. An optical receiver comprising:
   a local oscillator having means for performing phase modulation of a semiconductor laser by supplying a pulse current thereto, said local oscillator performing fixed phase switching between $\pi/2$ and $-\pi/2$ upon switching of phase sub-time slots obtained by dividing a time slot corresponding to a one-bit signal into not less than three portions;
   optical receiving means for receiving, as a reception signal, a beat component resulting from interference between output light from said local oscillator and signal light from an optical transmitter;
   delay means for dividing the reception signal received by said optical receiving means into two output components, and delaying one output component by a predetermined amount;
   a 90° hybrid circuit for shifting a phase of one of the two output components, one of which is delayed by said delay means, by 90°, and adding the phase-shifted output component to the other output component; and
   a detector for detecting an output from said 90° hybrid circuit in each sub-time slot.

6. The optical receiver according to claim 5, wherein said optical receiving means includes means for inhibiting signal detection at the instant when a frequency variation accompanying a phase variation of the output light of said local oscillator appears in an electrical beat signal.

7. The optical receiver according to claim 5, which includes AFC means for detecting a difference between a beat frequency and a preset value thereof and controlling an oscillation frequency of said local oscillator to set the beat frequency to be a predetermined value only when a frequency variation accompanying a phase variation of the output light of said local oscillator does not appear in a beat signal.

8. An optical receiver comprising:
   a local oscillator having a semiconductor laser and phase modulation means for performing phase modulation of said semiconductor laser by supplying a pulse current thereto, said local oscillator performing phase switching between $\pi/2$ and $-\pi/2$ upon switching of phase sub-time slots obtained by dividing a time slot corresponding to a one-bit signal into not less than two portions;
   optical receiving means for receiving, as a reception signal, a beat component resulting from interference between output light from said local oscillator and signal light from an optical transmitter;

delay means for dividing the reception signal received by said optical receiving means into two output components, and delaying one output component by a predetermined amount;

a 90° hybrid circuit for shifting a phase of one of the two output components, one of which is delayed by said delay means, by 90°, and adding the phase-shifted output component to the other output component;

a signal path switching circuit coupled before or after said 90° hybrid circuit with respect to the direction of signal transmission from said transmitter to said receiver; and a detector for detecting a signal transmitted through said 90° hybrid circuit and said signal path switching circuit, wherein image rejection signal reception is performed by switching said signal path switching circuit in synchronism with each phase sub-time slot.

9. The optical receiver according to claim 8, wherein said optical receiving means includes means for inhibiting signal detection at the instant when a frequency variation accompanying a phase variation of the output light of said local oscillator appears in an electrical beat signal.

10. The optical receiver according to claim 8, which includes AFC means for detecting a difference between a beat frequency and a preset value thereof and controlling an oscillation frequency of said local oscillator to set the beat frequency to be a predetermined value only when a frequency variation accompanying a phase variation of the output light of said local oscillator does not appear in a beat signal.

11. A coherent optical transmission system comprising:

at least one optical transmitter having phase modulation means for performing phase modulation of a semiconductor laser by supplying alternately positive and negative pulse currents thereto, said optical transmitter performing phase switching between $\pi/2$ and $-\pi/2$ upon switching of phase sub-time slots obtained by dividing a time slot corresponding to a one-bit signal into not less than two portions; and at least one optical receiver having a polarization switching light source, including a semiconductor laser, wherein a polarization switching timing of said polarization switching light source is set such that the different polarization states appear in the same phase state in one time slot of signal light, said polarization switching light source serving as a local oscillator, optical receiving means for receiving, as a reception signal, a beam component resulting from interference between output light from said local oscillator and signal light from said optical transmitter, a detector for detecting said reception signal of each sub-time slot, and means for adding detection outputs in new phase/polarization sub-time slots, which are divided at timings of polarization switching and phase switching and have different polarization and phase states, within a time slot, phase modulation means for supplying alternately positive and negative pulse currents to said semiconductor laser to perform phase modulation of said semiconductor laser, branch means for dividing the output light from said semiconductor laser into two branch output light components having substantially the same power;

delay means for delaying one branch output light component with respect to the other branch output light component by a predetermined amount, and means for mixing one delayed branch output light component with the other branch output light component while polarization states thereof are caused to be orthogonal, wherein a delay time of one branch output light component with respect to the other branch output light component is set to be a fraction of an integer of a period of the phase modulation.

12. The coherent optical transmission system according to claim 11, which includes means for detecting a clock by detecting a pulse-like frequency variation accompanying phase switching of said optical transmitter.

13. The coherent optical transmission system according to claim 11, which includes means for changing a pulse waveform, a pulse pattern, or a polarity by means of pulse-like frequency modulation for phase switching performed by said optical transmitter and pulse-like frequency modulation for polarization switching performed by said local oscillator of said optical receiver.

14. The coherent optical transmission system according to claim 11, which includes means for identifying and detecting a pulse-like frequency variation accompanying polarization switching and a pulse-like frequency variation accompanying phase switching, and means for controlling the timing of polarization switching by using the detected signals.

15. The coherent optical transmission system according to claim 11, wherein said optical receiver includes means for inhibiting signal detection at the instant when a frequency variation accompanying a phase variation of one of the signal light and the output light of said local oscillator appears in an electrical beat signal.

16. The coherent optical transmission system according to claim 11, which includes AFC means for detecting a difference between a beat frequency and a preset value thereof and controlling the oscillation frequency of said local oscillator to set the beat frequency to be a predetermined value only when a frequency variation accompanying a phase variation of the output light of said local oscillator does not appear in an electrical beat signal.

17. The coherent optical transmission system according to claim 11, which includes means for controlling said optical transmitters so as to match all the timings of phase switching of the respective optical transmitters with each other in the corresponding optical receivers.

18. A coherent light transmission system comprising:

at least one optical transmitter having phase modulation means for performing phase modulation of a semiconductor laser by supplying alternately positive and negative pulse currents thereto, said optical transmitter performing fixed phase switching between $\pi/2$ and $-\pi/2$ upon switching of phase sub-time slots obtained by dividing a time slot corresponding to a one-bit signal into not less than three portions; and at least one optical light receiver for performing image removing signal reception, said optical receiver having an optical receiving unit for receiving, as a reception signal, a beat component resulting from interference between local oscillation light from a local oscillator and an optical signal from said optical transmitter, delay means for dividing said reception signal received by said light receiving unit into two output components, and delaying one output component by a predetermined amount, a 90° hybrid circuit for shifting a phase of one of the two output components, one of which is delayed by said delay means, by 90°, and adding the phase-shifted output component to the other output component, and a detector for detecting an output from said 90° hybrid circuit in each sub-time slot.

19. The coherent optical transmission system according to claim 18, wherein said local oscillator is constituted by a polarization switching light source, and includes means for adding detection outputs having different polarization states in one time slot.

20. The coherent optical transmission system according to claim 18, which includes means for detecting a clock by detecting a pulse-like frequency variation accompanying phase switching of said optical transmitter.

21. The coherent optical transmission system according to claim 19, which includes means for changing a pulse waveform, a pulse pattern, or a polarity by means of pulse-like frequency modulation for phase switching performed by said optical transmitter and pulse-like frequency modulation for polarization switching performed by said local oscillator of said optical receiver.

22. The coherent optical transmission system according to claim 18, which includes means for identifying and detecting a pulse-like frequency variation accompanying polarization switching and a pulse-like frequency variation accompanying phase switching, and means for controlling the timing of polarization switching by using the detected signals.

23. The coherent optical transmission system according to claim 18, wherein said optical receiver includes means for inhibiting signal detection at the instant when a frequency variation accompanying a phase variation of one of the signal light and the output light of said local oscillator appears in an electrical beat signal.

24. The coherent optical transmission system according to claim 18, which includes AFC means for detecting a difference between a beat frequency and a preset value thereof and controlling the oscillation frequency of said local oscillator to set the beat frequency to be a predetermined value only when a frequency variation accompanying a phase variation of the output light of said local oscillator does not appear in an electrical beat signal.

25. The coherent optical transmission system according to claim 18, which includes means for controlling said optical transmitters so as to match all the timings of phase switching of the respective optical transmitters with each other in the corresponding optical receivers.

26. A coherent light transmission system comprising:
at least one optical transmitter having phase modulation means for performing phase modulation of a semiconductor laser by supplying alternately positive and negative pulse currents thereto, said optical transmitter performing phase switching between $\pi/2$ and $-\pi/2$ upon switching of phase sub-time slots obtained by dividing a time slot corresponding to a one-bit signal into not less than two portions; and
at least one optical receiver having an optical receiving unit for receiving, as a reception signal, a beat component resulting from interference between local oscillation light from a local oscillator and signal light from said optical transmitter, delay means for dividing said reception signal received by said optical receiving unit into two output components, and delaying one output component by a predetermined amount, a 90° hybrid circuit for shifting a phase of one of the two output components, one of which is delayed by said delay means, by 90°, and adding the phase-shifted output component to the other output component, a signal path switching circuit coupled before or after said 90° hybrid circuit with respect to the direction of signal transmission from said transmitter to said receiver, and a detector for detecting a signal transmitted through said 90° hybrid circuit and said signal path switching circuit, said optical receiver performing image rejection signal reception by switching said signal path switching circuit in synchronism with each phase sub-time slot of an optical signal generated upon phase switching of said optical transmitter.

27. The coherent optical transmission system according to claim 26, wherein said local oscillator is constituted by a polarization switching light source, and includes means for adding detection output having different polarization states in one time slot.

28. The coherent optical transmission system according to claim 26, which includes means for detecting a clock by detecting a pulse-like frequency variation accompanying phase switching of said optical transmitter.

29. The coherent optical transmission system according to claim 27, which includes means for changing a pulse waveform, a pulse pattern, or a polarity by means of pulse-like frequency modulation for phase switching performed by said optical transmitter and pulse-like frequency modulation for polarization switching performed by said local oscillator of said optical receiver.

30. The coherent optical transmission system according to claim 26, which includes means for identifying and detecting a pulse-like frequency variation accompanying polarization switching and a pulse-like frequency variation accompanying phase switching, and means for controlling the timing of polarization switching by using the detected signals.

31. The coherent optical transmission system according to claim 26, wherein said optical receiver includes means for inhibiting signal detection at the instant when a frequency variation accompanying a phase variation of one of the signal light and the output light of said local oscillator appears in an electrical beat signal.

32. The coherent optical transmission system according to claim 26, which includes AFC means for detecting a difference between a beat frequency and a preset value thereof and controlling the oscillation frequency of said local oscillator to set the beat frequency to be a predetermined value only when a frequency variation accompanying a phase variation of the output light of said local oscillator does not appear in an electrical beat signal.

33. The coherent optical transmission system according to claim 26, which includes means for controlling said optical transmitters so as to match all the timings of phase switching of the respective optical transmitters with each other in the corresponding optical receivers.

* * * * *